(12) United States Patent
Hisada et al.

(10) Patent No.: US 12,422,528 B2
(45) Date of Patent: Sep. 23, 2025

(54) LIGHT EMITTING DEVICE, PHOTO-DETECTION SYSTEM, AND VEHICLE

(71) Applicant: Panasonic Intellectual Property Management Co., Ltd., Osaka (JP)

(72) Inventors: Kazuya Hisada, Nara (JP); Yasuhisa Inada, Osaka (JP); Yumiko Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 960 days.

(21) Appl. No.: 17/544,750

(22) Filed: Dec. 7, 2021

(65) Prior Publication Data

US 2022/0099809 A1    Mar. 31, 2022

Related U.S. Application Data

(63) Continuation of application No. PCT/JP2020/029911, filed on Aug. 5, 2020.

(30) Foreign Application Priority Data

Sep. 5, 2019    (JP) .................................. 2019-162292

(51) Int. Cl.
*G01S 7/481*    (2006.01)
*G01S 17/36*    (2006.01)
(Continued)

(52) U.S. Cl.
CPC ............ *G01S 7/4817* (2013.01); *G01S 17/36* (2013.01); *G01S 17/89* (2013.01); *G02F 1/295* (2013.01); *G01S 17/931* (2020.01)

(58) Field of Classification Search
CPC ........ G01S 7/4817; G01S 17/36; G01S 17/89; G01S 17/931; G02F 1/295; G02B 26/101
(Continued)

(56) References Cited

U.S. PATENT DOCUMENTS 7,186,567 B1 *   3/2007   Sutherland ....... G01N 33/54366
                                                    252/582
9,372,339 B2 *   6/2016   Toyoda ................... H01S 3/107
(Continued)

FOREIGN PATENT DOCUMENTS

JP    2009-002978    1/2009
JP    2013-061488    4/2013
(Continued)

OTHER PUBLICATIONS

International Search Report of PCT application No. PCT/JP2020/029911 dated Oct. 20, 2020.

*Primary Examiner* — Pinping Sun
*Assistant Examiner* — Andrew R Wright
(74) *Attorney, Agent, or Firm* — Rimon P.C.

(57) ABSTRACT

A light emitting device includes a light source that emits an optical beam in response to a control signal, an optical deflector that changes a direction of the optical beam in response to a driving voltage, and a control circuit that controls a timing of emission of the optical beam and the direction of the optical beam. The optical deflector is configured to change the direction of the optical beam along a first direction and a second direction different from the first direction and a rate of change in the direction of the optical beam along the first direction is lower than a rate of change in the direction of the optical beam along the second direction.

13 Claims, 17 Drawing Sheets

(51) Int. Cl.
    *G01S 17/89*     (2020.01)
    *G01S 17/931*    (2020.01)
    *G02F 1/295*     (2006.01)

(58) Field of Classification Search
    USPC .......................................................... 359/315
    See application file for complete search history.

(56) References Cited

U.S. PATENT DOCUMENTS

| | | | |
|---|---|---|---|
| 10,302,746 B2 | 5/2019 | O'Keeffe | |
| 2013/0155723 A1* | 6/2013 | Coleman | G02B 6/0028 |
| | | | 362/621 |
| 2017/0090269 A1* | 3/2017 | Huang | G02B 6/005 |
| 2017/0123268 A1* | 5/2017 | Sasaki | H10H 29/10 |
| 2018/0113200 A1* | 4/2018 | Steinberg | G01S 17/10 |
| 2018/0128920 A1* | 5/2018 | Keilaf | G01S 7/4918 |
| 2018/0217258 A1* | 8/2018 | Hirasawa | G01S 17/86 |
| 2018/0224709 A1 | 8/2018 | Inada et al. | |
| 2019/0094363 A1 | 3/2019 | Ohtomo et al. | |
| 2019/0107623 A1* | 4/2019 | Campbell | G01S 7/4865 |
| 2019/0204423 A1* | 7/2019 | O'Keeffe | G01S 17/89 |
| 2019/0385334 A1* | 12/2019 | Hong | G08G 1/166 |

FOREIGN PATENT DOCUMENTS

| | | |
|---|---|---|
| JP | 2018-124271 | 8/2018 |
| JP | 2018-128663 | 8/2018 |
| JP | 2019-060644 | 4/2019 |
| KR | 101964971 B1 * | 4/2019 |

* cited by examiner

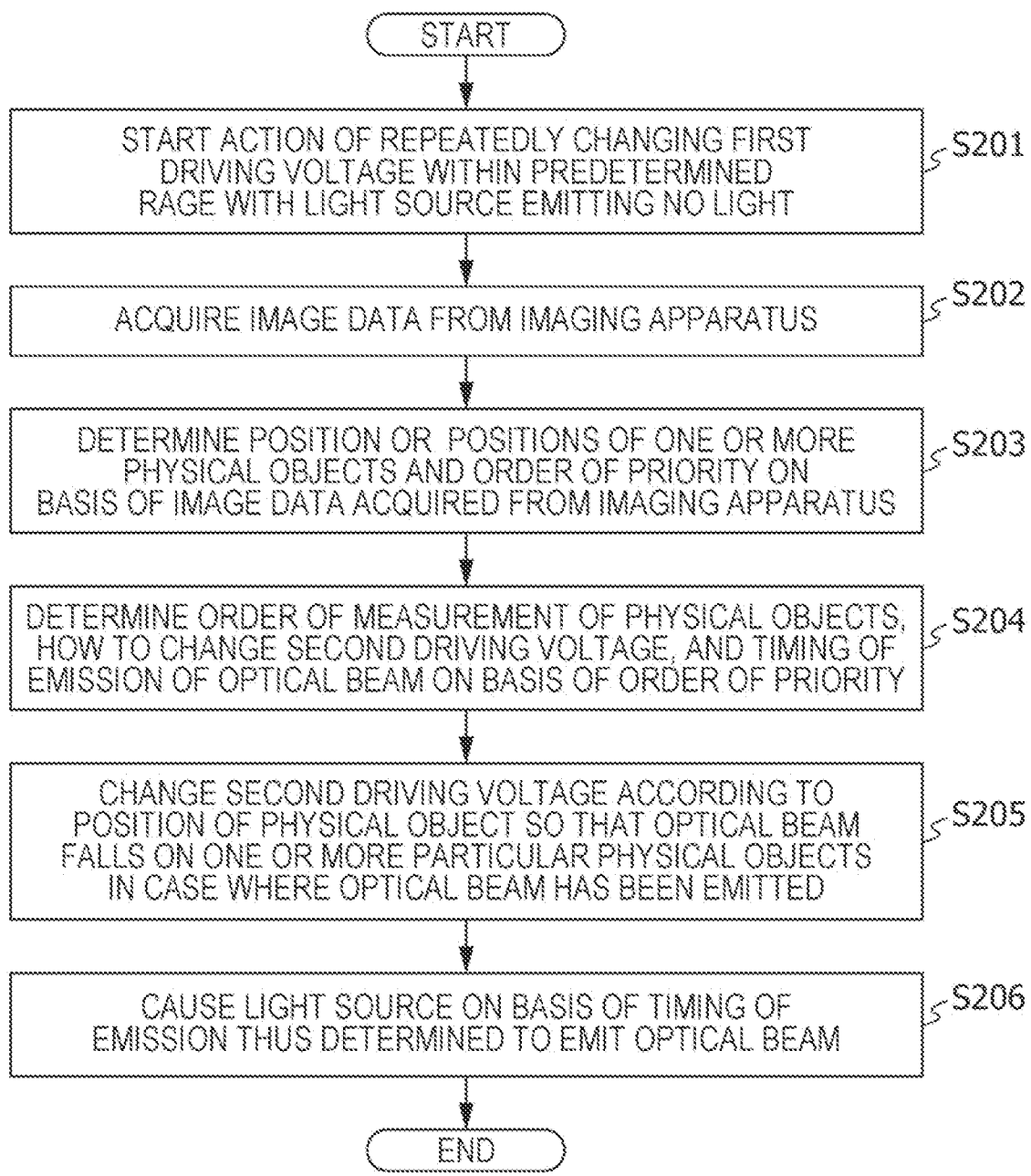

FIG. 12B

| PHYSICAL OBJECT | ORDER OF PRIORITY | COORDINATES |
|---|---|---|
| A | 3 | $X_a, Y_a$ |
| B | 4 | $X_b, Y_b$ |
| C | 2 | $X_c, Y_c$ |
| D | NO NEED TO MEASURE | $X_d, Y_d$ |
| E | 1 | $X_e, Y_e$ |
| F | NO NEED TO MEASURE | $X_f, Y_f$ |

FIG. 12C

| ORDER OF MEASUREMENT | PHYSICAL OBJECT | SECOND DRIVING VOLTAGE | TIMING OF EMISSION |
|---|---|---|---|
| 1 | A | $V_a$ | $T_a$ |
| 2 | C | $V_c$ | $T_b$ |
| 3 | E | $V_e$ | $T_c$ |
| 4 | B | $V_b$ | $T_d$ |

LIGHT EMITTING DEVICE, PHOTO-DETECTION SYSTEM, AND VEHICLE

BACKGROUND

1. Technical Field

The present disclosure relates to a light emitting device, a photo-detection system, and a vehicle.

2. Description of the Related Art

There have conventionally been proposed various types of device that scan a scene with an optical beam, detect reflected light from a physical object included in the scene, and measures the distance to the physical object (see, for example, Japanese Unexamined Patent Application Publication No. 2018-128663 and U.S. Patent Application Publication No. 2018/0224709).

SUMMARY

One non-limiting and exemplary embodiment provides a light emitting device that is capable of efficiently irradiating a physical object with an optical beam.

In one general aspect, the techniques disclosed here feature a light emitting device including a light source that emits an optical beam in response to a control signal inputted to the light source, an optical deflector that changes a direction of the optical beam in response to a driving voltage inputted to the optical deflector, and a control circuit that controls a timing of emission of the optical beam and the direction of the optical beam by inputting the control signal to the light source and inputting the driving voltage to the optical deflector. The optical deflector is capable of changing the direction of the optical beam along a first direction and a second direction different from the first direction. A rate of change in the direction of the optical beam along the first direction is lower than a rate of change in the direction of the optical beam along the second direction. In a period of time during which a component of the direction of the optical beam acting in the first direction is being periodically changed by the driving voltage, the control circuit changes, according to a position or positions of one or more physical objects, a component of the direction of the optical beam acting in the second direction.

The technology of the present disclosure makes it possible to achieve a light emitting device that is capable of efficiently irradiating a physical object with an optical beam.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a flow chart showing another example of an operation of the control circuit;

FIG. 12B is a diagram showing an example of information determined in step S203;

FIG. 12C is a diagram showing an example of information determined in step S204;

DETAILED DESCRIPTION

Figure 1:
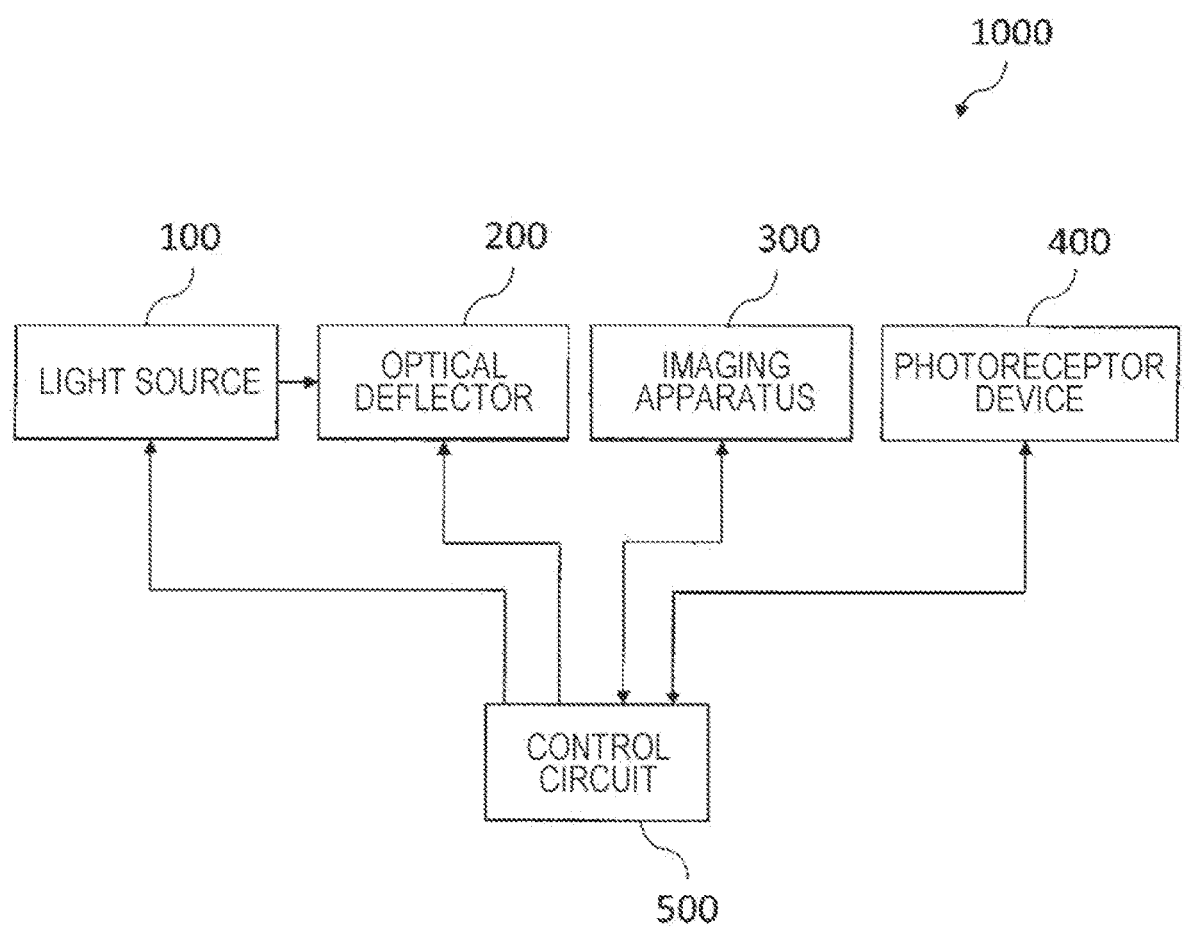
FIG. 1 is a block diagram schematically showing an example of a photo-detection system according to an embodiment of the present disclosure.

Examples of devices that scan a scene of a target of ranging with an optical beam include devices disclosed in Japanese Unexamined Patent Application Publication No. 2018-128663, U.S. Patent Application Publication No.

2018/0224709, and Japanese Unexamined Patent Application Publication No. 2009-002978.

Japanese Unexamined Patent Application Publication No. 2018-128663 and U.S. Patent Application Publication No. 2018/0224709 disclose an optical scan device including two multilayer reflecting films facing each other and an optical waveguide layer composed of a liquid crystal material sandwiched between those multilayer reflecting films. By changing the refractive index of the liquid crystal material by applying a driving voltage to the optical waveguide layer, the direction of an optical beam can be changed. The device disclosed in Japanese Unexamined Patent Application Publication No. 2009-002978 can change the direction of an optical beam by changing the orientation of a MEMS (micro-electromechanical system) mirror by applying a driving voltage.

In these devices, the rate of change in the direction of the optical beam depends on a voltage difference in driving voltage made by the application. When the voltage difference is great, the rate of change is high. When the voltage difference is small, the rate of change is low. Further, these devices require time between changing the driving voltage to change the position of irradiation with the optical beam to a predetermined position and actual convergence of the position of irradiation with the optical beam to the predetermined position. The greater the voltage difference made by the change is, the harder it is for the position of irradiation with the optical beam to converge. The smaller the voltage difference made by the change is, the easier it is for the position of irradiation with the optical beam to converge.

Meanwhile, in order to obtain distance information on a plurality of physical objects scattered about in a scene, such a device may be used in such a way that the direction of emission of an optical beam is changed in sequence toward those physical objects. For example, in order to obtain distance data on a plurality of physical objects recognized on the basis of image data acquired by an on-board camera, such a device may be used in such a way that optical beams are emitted in sequence toward those physical objects. In such a use, the direction of emission of an optical beam needs to be quickly changed.

A light emitting device according to the present disclosure repeatedly changes a driving voltage for example periodically within a predetermined range and emits an optical beam at a desired time. Such an operation makes it possible to efficiently irradiate one or more physical objects with the optical beam.

A light emitting device according to a first item includes a light source that emits an optical beam in response to a control signal inputted to the light source, an optical deflector that changes a direction of the optical beam in response to a driving voltage inputted to the optical deflector, and a control circuit that controls a timing of emission of the optical beam and the direction of the optical beam by inputting the control signal to the light source and inputting the driving voltage to the optical deflector. The control circuit may repeatedly change the driving voltage within a predetermined range. The control circuit may determine the timing of emission and, in a period of time during which the driving voltage is being changed, may cause the light source on the basis of the timing of emission thus determined to emit the optical beam. Outside of the timing of emission in the period of time during which the driving voltage is being changed, the control circuit may cause the light source to stop emitting the optical beam.

This light emitting device makes it possible to efficiently irradiate one or more physical objects with the optical beam by repeatedly changing the direction of the optical beam and emitting the optical beam at a desired time.

A light emitting device according to a second item is directed to the light emitting device according to the first item, wherein the control circuit periodically changes the driving voltage.

The light emitting device makes it easy to control the driving voltage.

A light emitting device according to a third item is directed to the light emitting device according to the first or second item, wherein during operation, the control circuit acquires, from a different apparatus, data for determining the timing of emission.

This light emitting device makes it possible to efficiently determine the timing of emission, depending on the different apparatus.

A light emitting device according to a fourth item is directed to the light emitting device according to the third item, wherein the different apparatus is an imaging apparatus. The data is image data representing a scene including the one or more physical objects. The timing of emission is such a timing that the one or more physical objects recognized from the image data are irradiated with the optical beam.

This light emitting device makes it possible to efficiently determine the timing of emission on the basis of image data acquired in a single imaging by the imaging apparatus.

A light emitting device according to a fifth item is directed to the light emitting device according to any of the first to fourth items, wherein the optical deflector includes first and second multilayer reflecting films facing each other, a liquid crystal layer located between the first and second multilayer reflecting films, and two electrodes through which the driving voltage is applied to the liquid crystal layer. The optical beam emitted from the light source propagates through inside of the liquid crystal layer and is emitted from the first multilayer reflecting film. The direction of the optical beam that is emitted from the first multilayer reflecting film changes according to a change in the driving voltage.

This light emitting device makes it possible to change the direction of the optical beam by changing the refractive index of the liquid crystal layer by applying the driving voltage to the liquid crystal layer of the optical deflector.

A light emitting device according to a sixth item is directed to the light emitting device according to any of the first to fifth items, wherein the optical deflector includes a MEMS mirror that reflects the optical beam emitted from the light source. The MEMS mirror rotates through application of the driving voltage. The direction of the optical beam thus reflected changes as a direction of the MEMS mirror changes according to a change in the driving voltage.

This light emitting device makes it possible to change the direction of the optical beam by rotating the MEMS mirror by applying the driving voltage.

A light emitting device according to a seventh item is directed to the light emitting device according to any of the first to sixth items, wherein the predetermined range of the driving voltage ranges from a negative first voltage to a positive second voltage.

This light emitting device makes it possible to greatly change the direction of the optical beam with the driving voltage changing from the negative first voltage to the positive second voltage.

A light emitting device according to an eighth item is directed to the light emitting device according to any of the first to seventh items, wherein the optical deflector changes the direction of the optical beam along the first direction in response to a change in the driving voltage and, furthermore, changes the direction of the optical beam along a second direction different from the first direction. While changing a component of the direction of the optical beam acting in the second direction, the control circuit causes the light source to emit the optical beam more than once.

This light emitting device makes it possible to entirely scan one physical object and irradiate a plurality of physical objects in sequence.

A light emitting device according to a ninth item is directed to the light emitting device according to the eighth item, wherein a rate of change in the direction of the optical beam along the first direction is lower than a rate of change in the direction of the optical beam along the second direction.

This light emitting device makes it possible to efficiently irradiate one or more particular physical objects with the optical beam by changing the direction of the optical beam along the second direction, in which the rate of change is relatively high, according to the position of a physical object while repeatedly changing the direction of the optical beam along the first direction, in which the rate of change is relatively low.

A light emitting device according to a tenth item is directed to the light emitting device according to the eighth or ninth item, wherein the first direction and the second direction are orthogonal to each other.

This light emitting device makes it easy to change the direction of the optical beam.

A light emitting device according to an eleventh item is directed to the light emitting device according to any of the eighth to tenth items, wherein the light emitting device is attached to a vehicle for use. In a state of being attached to the vehicle, an angle formed by a plane including the first direction and a horizontal plane is greater than or equal to 0 degree and less than or equal to 45 degrees.

This light emitting device makes it possible to, while changing the optical beam along the first direction once, quickly measure the distances to a plurality of pedestrians who are in front of the vehicle.

A photo-detection system according to a twelfth item includes the light emitting device according to any of the first to eleventh items and a photoreceptor device that detects reflected light from one or more physical objects.

This photo-detection system makes it possible to measure the distance to a physical object on the basis of a signal from the photoreceptor device.

A photo-detection system according to a thirteenth item is directed to the photo-detection system according to the twelfth item, wherein the photoreceptor device includes an imaging apparatus that generates image data representing a scene including the one or more physical objects.

This photo-detection system makes it possible to acquire image data on the one or more physical objects in a single imaging with an imaging apparatus of the photoreceptor device and efficiently determine the timing of emission.

A vehicle according to a fourteenth item includes the photo-detection system according to the twelfth or thirteenth item.

This vehicle makes it possible to quickly measure the distance to a physical object.

In the present disclosure, all or some of the circuits, units, devices, members, or sections or all or some of the functional blocks in the block diagrams may be implemented as one or more electronic circuits including, but not limited to, a semiconductor device, a semiconductor integrated circuit (IC), or an LSI (large scale integration). The LSI or IC can be integrated into one chip, or also can be a combination of multiple chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or some of the functions or operations of the circuits, units, apparatuses, members, or sections are implemented by executing software. In such a case, the software is recorded on one or more non-transitory recording media such as a ROM, an optical disk, or a hard disk drive, and when the software is executed by a processor, the software causes the processor together with peripheral devices to execute the functions specified in the software. A system or device may include such one or more non-transitory recording media on which the software is recorded and a processor together with necessary hardware devices such as an interface.

In the present disclosure, the term "light" means electromagnetic waves including ultraviolet radiation (ranging from approximately 10 nm to approximately 400 nm in wavelength) and infrared radiation (ranging from approximately 700 nm to approximately 1 mm in wavelength) as well as visible light (ranging approximately 400 nm to approximately 700 nm in wavelength).

The following describes a more specific embodiment of the present disclosure. Note, however, that an unnecessarily detailed description may be omitted. For example, a detailed description of a matter that is already well known and a repeated description of substantially identical configurations may be omitted. This is intended to avoid unnecessary redundancy of the following description and facilitate understanding of persons skilled in the art. It should be noted that the inventors provide the accompanying drawings and the following description for persons skilled in the art to fully understand the present disclosure and do not intend to thereby limit the subject matter recited in the claims. In the following description, identical or similar constituent elements are given the same reference signs.

Embodiment

First, a basic example configuration of a photo-detection system according to an embodiment of the present disclosure is described with reference to FIG. 1. FIG. 1 is a block diagram schematically showing an example of a photo-detection system 1000 according to an embodiment of the present disclosure. The photo-detection system 1000 according to the present embodiment includes a light source 100, an optical deflector 200, an imaging apparatus 300, and a photoreceptor device 400, and a control circuit 500.

The light source 100 according to the present embodiment is configured to emit an optical beam in response to a control signal inputted from the control circuit 500. The light source 100 may include, for example, a semiconductor laser element. The wavelength of the optical beam that is emitted from the light source 100 may be selected depending on the intended use. In a case where the distance from the photo-detection system 1000 to a physical object is measured with infrared rays, the wavelength of the optical beam may for example be longer than or equal to 700 nm and shorter than or equal to 2.5 µm. The wavelength of the optical beam may be a visible-range wavelength, e.g. approximately longer than or equal to 400 nm and approximately shorter than or equal to 700 nm. The wavelength of the optical beam may be longer than 2.5 µm.

The optical deflector 200 according to the present embodiment is configured to change the direction of the optical beam in response to a driving voltage inputted from the control circuit 500. For example, the optical deflector 200 may be configured to change the direction of the optical beam along two intersecting directions in response to two driving voltages inputted to the optical deflector 200. A specific example of a configuration of the optical deflector 200 will be described later.

The imaging apparatus 300 according to the present embodiment acquires image data representing a scene that is irradiated with the optical beam. On the basis of this image data, one or more physical objects in the scene are identified. The one or more physical objects may be illuminated with light from a source other than the light source 100. e.g. sunlight. Before the distance to a physical object is measured with the optical beam from the light source 100, the imaging apparatus 300 generates image data representing a scene including the physical object. The imaging apparatus 300 may include, for example, a plurality of pixels arranged in a two-dimensional array. Each pixel stores an electric charge corresponding to the amount of light falling on that pixel. The position of the physical object can be identified from the amount of electric charge stored in the plurality of pixels. The imaging apparatus 300 may be a visible or infrared camera, an apparatus involving the use of sound waves, millimeter waves, or terahertz waves, or a ranging apparatus involving the use of light. The ranging apparatus may be used to give the approximate distance to the physical object.

The photoreceptor device 400 according to the present embodiment detects reflected light from a physical object irradiated with the optical beam emitted from the light source 100. The photoreceptor device 400 may be identical or different in configuration to the imaging apparatus 300. The photo-detection system 1000 does not need to include both the imaging apparatus 300 and the photoreceptor device 400. The photo-detection system 1000 may include one apparatus that functions as both the imaging apparatus 300 and the photoreceptor device 400.

The control circuit 500 according to the present embodiment is a processor that controls the light source 100, the optical deflector 200, the imaging apparatus 300, and the photoreceptor device 400. The control circuit 500 acquires image data from the imaging apparatus 300 and, on the basis of the image data, determines the direction and timing of emission of the optical beam according to the position of a physical object. Specifically, the control circuit 500 inputs a control signal to the light source 100 and inputs a driving voltage to the optical deflector 200 so that the optical beam falls on a physical object recognized from the image data. This allows the timing and direction of emission of the optical beam to be appropriately controlled. The control circuit 500 according to the present embodiment causes the light source 100 to emit an optical beam and causes the photoreceptor device 400 to detect reflected light from the physical object due to the optical beam. The control circuit 500 measures the distance from the photo-detection system 1000 to the physical object on the basis of a signal generated by the photoreceptor device 400. This distance measurement involves the use of, for example, a publicly-known TOF (time-of-flight) technique. Operation of the control circuit 500 will be described in detail later.

In the present embodiment, a device including the light source 100, the optical deflector 200, the imaging apparatus 300, and the control circuit 500 is referred to as "light emitting device". That is, the photo-detection system 1000 includes the light emitting device and the photoreceptor device 400. The imaging apparatus 300 is provided depending on the intended use, and may be omitted. For example, in a case where the photoreceptor device 400 also functions as the imaging apparatus 300, the light emitting device does not include the imaging apparatus 300.

Figure 2A:
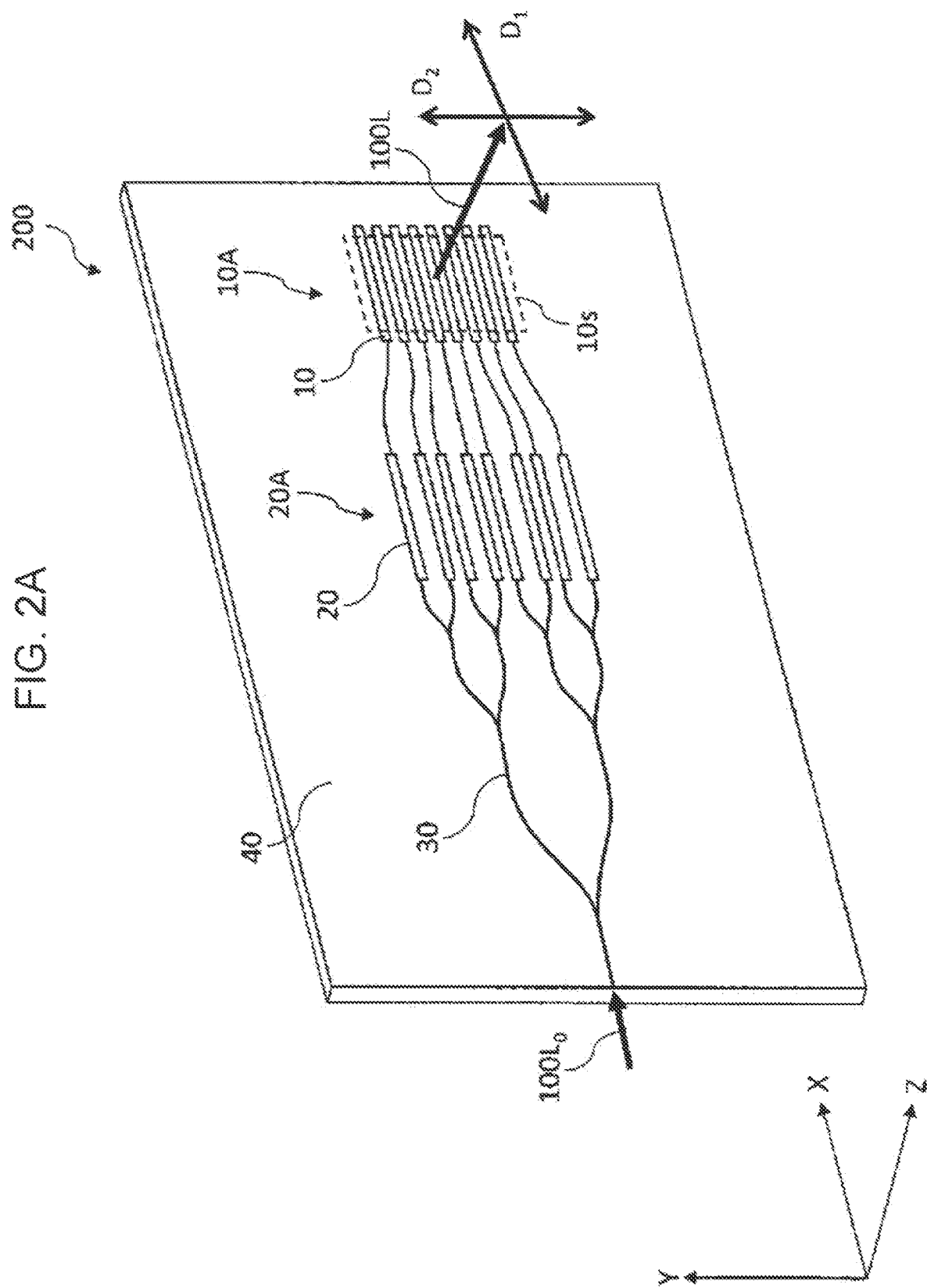
FIG. 2A is a perspective view schematically showing an example of an optical deflector according to the present embodiment.

Next, a specific example configuration of the optical deflector 200 according to the present embodiment is described with reference to FIG. 2A. FIG. 2A is a perspective view schematically showing an example of the optical deflector 200 according to the present embodiment. For reference, X, Y, and Z axes that are orthogonal to one another are schematically shown. The optical deflector 200 includes an optical waveguide array 10A, a phase shifter array 20A, an optical divider 30, and a substrate 40 on which the optical waveguide array 10A, the phase shifter array 20A, and the optical divider 30 are integrated. The optical waveguide array 10A includes a plurality of optical waveguide elements 10 arrayed in a Y direction. Each optical waveguide element 10 extends in an X direction. The phase shifter array 20A includes a plurality of phase shifters 20 arrayed in the Y direction. Each phase shifter 20 extends in the X direction. The plurality of optical waveguide elements 10 of the optical waveguide array 10A are connected separately to each of the plurality of phase shifters 20 of the phase shifter array 20A. The optical divider 30 is connected to the phase shifter array 20A.

An optical beam $100L_0$ emitted from the light source 100 enters the plurality of phase shifters 20 of the phase shifter array 20A via the optical divider 30. Light having passed through the plurality of phase shifters 20 of the phase shifter array 20A separately enter each of the plurality of the optical waveguide elements 10 of the optical waveguide array 10A with its phase shifted by a constant amount in the Y direction. The light having separately entered each of the plurality of the optical waveguide elements 10 of the optical waveguide array 10A exits as an optical beam 100L from a light exit surface 10s parallel to an X-Y plane in a direction intersecting the light exit surface 10s.

Figure 2B:
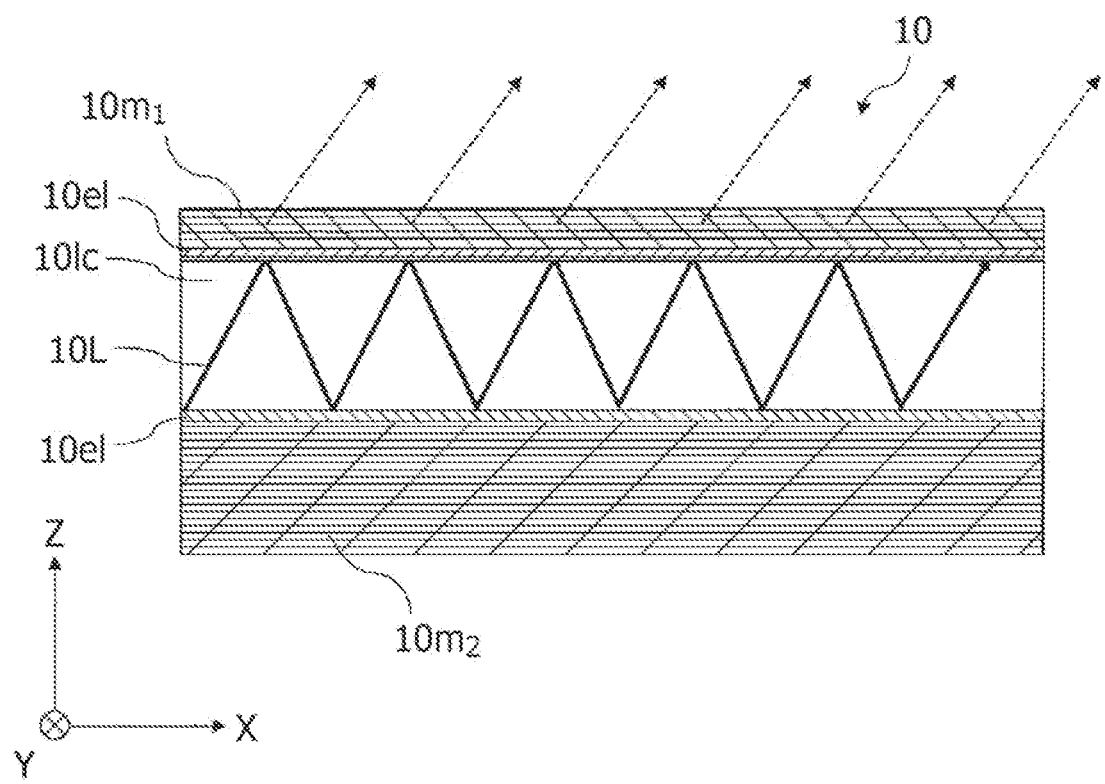
FIG. 2B is a diagram schematically showing an example of an optical waveguide element according to the present embodiment.

Next, a specific example configuration of an optical waveguide element 10 according to the present embodiment is described with reference to FIG. 2B. FIG. 2B is a diagram schematically showing an example of an optical waveguide element 10 according to the present embodiment. The optical waveguide element 10 according to the present embodiment includes first and second mirrors $10m_1$ and $10m_2$ facing each other, a liquid crystal layer $10lc$, located between the first mirror $m_1$ and the second mirror $m_2$, that contains a liquid crystal material, and a pair of first electrodes $10el$ through which a first driving voltage is applied to the liquid crystal layer $10lc$. The transmittance of the first mirror $10m_1$ is higher than the transmittance of the second mirror $10m_2$. At least either the first mirror $10m_1$ or the second mirror $10m_2$ may be formed, for example, from a multilayer reflecting film in which a plurality of high-refractive-index layers and a plurality of low-refractive-index layers are alternately stacked. The first mirror $10m_1$ and the second mirror $10m_2$ may be formed from multilayer reflecting films including the same high-refractive-index layers and the same low-refractive-index layers. In this case, by making the number of layers that are stacked in the first mirror $10m_1$ smaller than the number of layers that are stacked in the second mirror $10m_2$, the transmittance of the first mirror $10m_1$ can be made higher than the transmittance of the second mirror $10m_2$.

A portion 10L of the optical beam 100L$_0$ emitted from the light source 100 propagates through the inside of the liquid crystal layer 10lc along the X direction while being reflected by the first mirror 10m$_1$ and the second mirror 10m$_2$. In so doing, a portion of the light 10L propagating through the inside of the liquid crystal layer 10lc is emitted outward from the first mirror 10m$_1$.

The application of the first driving voltage to the pair of first electrodes 10el effects a change in the refractive index of the liquid crystal material contained in the liquid crystal layer 10lc, so that the direction of light that is emitted outward from the optical waveguide element 10 changes. The rate of change in the refractive index of the liquid crystal material with respect to a change in the first driving voltage may for example be higher than or equal to 30 Hz and lower than or equal to 120 Hz. According to the change in the first driving voltage, the direction of the optical beam 100L that is emitted from the optical waveguide array 10A changes. Specifically, in the example shown in FIG. 2A, a first angle of emission formed by the direction of emission of the optical beam 100L and a plane parallel to a Y-Z plane changes. A direction obtained by projecting the direction of change in the first angle of emission onto the light exit surface 10s is herein referred to as "first direction D$_1$".

Figure 2C:
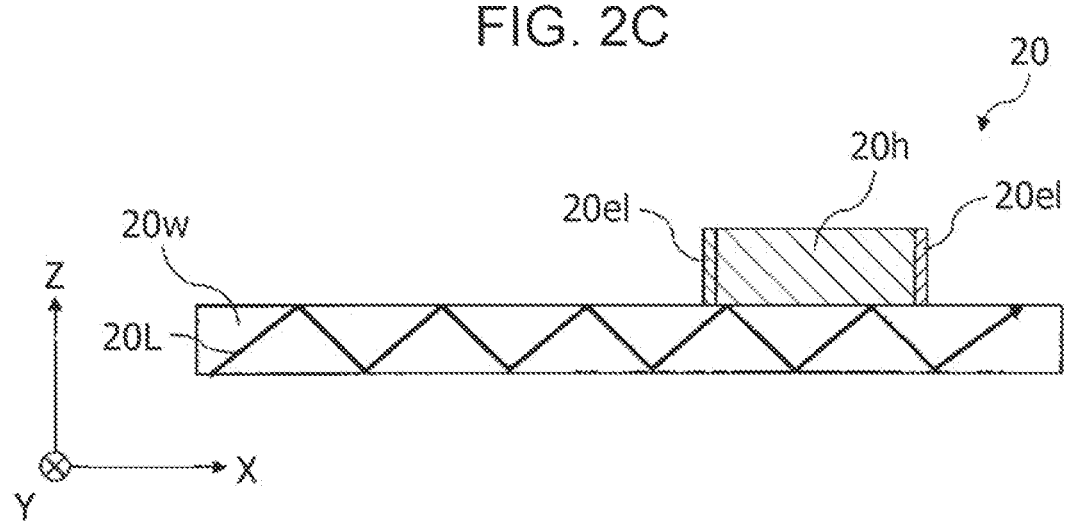
FIG. 2C is a diagram schematically showing an example of a phase shifter according to the present embodiment.

Next, a specific example configuration of a phase shifter 20 according to the present embodiment is described with reference to FIG. 2C. FIG. 2C is a diagram schematically showing an example of a phase shifter 20 according to the present embodiment. The phase shifter 20 according to the present embodiment includes a total reflection waveguide 20w containing a thermo-optic material whose refractive index changes by heat, a heater 20h that is in thermal contact with the total reflection waveguide 20w, and a pair of second electrodes 20el through which a second driving voltage is applied to the heater 20h. The refractive index of the total reflection waveguide 20w is higher the refractive indices of the heater 20h, the substrate 40, and air. The refractive index difference causes a portion 20L of the optical beam 100L$_0$ emitted from the light source 100 to propagate through the inside of the total reflection waveguide 20w along the X direction while being totally reflected.

The application of the second driving voltage to the pair of second electrodes 20el causes the total reflection waveguide 20w to be heated by the heater 20h. This results in a change in the reflective index of the total reflection waveguide 20w, so that the phase of the light 20L that is outputted from an edge of the total reflection waveguide 20w shifts. The rate of change in the refractive index of the thermo-optic material with respect to a change in the second driving voltage may for example be higher than or equal to 1 kHz and lower than or equal to 10 kHz. In the example shown in FIG. 2A, when the phase of the light 20L that is emitted from the plurality of phase shifters 20 of the phase shifter array 20A increases or decreases by a constant amount along the Y direction, a second angle of emission formed by the direction of emission of the optical beam 100L and a plane parallel to an X-Z plane changes. A direction obtained by projecting the direction of change in the second angle of emission onto the light exit surface 10s is herein referred to as "second direction D$_2$". The first direction D$_1$ and the second direction D$_2$ are orthogonal to each other.

Assuming that an optical beam has been emitted toward a virtual screen placed at a predetermined distance from the light emitting device in parallel with the first direction D$_1$ and the second direction D$_2$, the term "position of irradiation with the optical beam 100L" herein means the position of irradiation of the virtual screen with the optical beam. The virtual screen is equivalent to a region to be measured.

Details such as the principle of operation and method of operation of the optical deflector 200 according to the present embodiment are disclosed in U.S. Patent Application Publication No. 2018/0224709, the entire contents of which are hereby incorporated by reference.

As noted above, the refractive index of the liquid crystal material and the refractive index of the thermo-optic material are different in rate of change from each other. Due to this difference in rate of change, the rate of change in direction of the optical beam 100L along the first direction D$_1$ is lower than the rate of change in direction of the optical beam 100L along the second direction D$_2$. The "rate of change in direction of the optical beam 100L along the first direction D$_1$" is herein referred to simply as "rate of change in the first direction D$_1$", and the "rate of change in direction of the optical beam 100L along the second direction D$_2$" is herein referred to simply as "rate of change in the second direction D$_2$". In the present embodiment, in order to efficiently emit the optical beam 100L toward a physical object, an operation of changing the direction of the optical beam 100L along the first direction D$_1$, in which the rate of change is relatively low, is periodically performed. In this respect, the operation of changing the direction of the optical beam 100L along the first direction D$_1$ is different from an operation of changing the direction of the optical beam 100L along the second direction D$_2$, in which the rate of change is relatively high.

Figure 3:
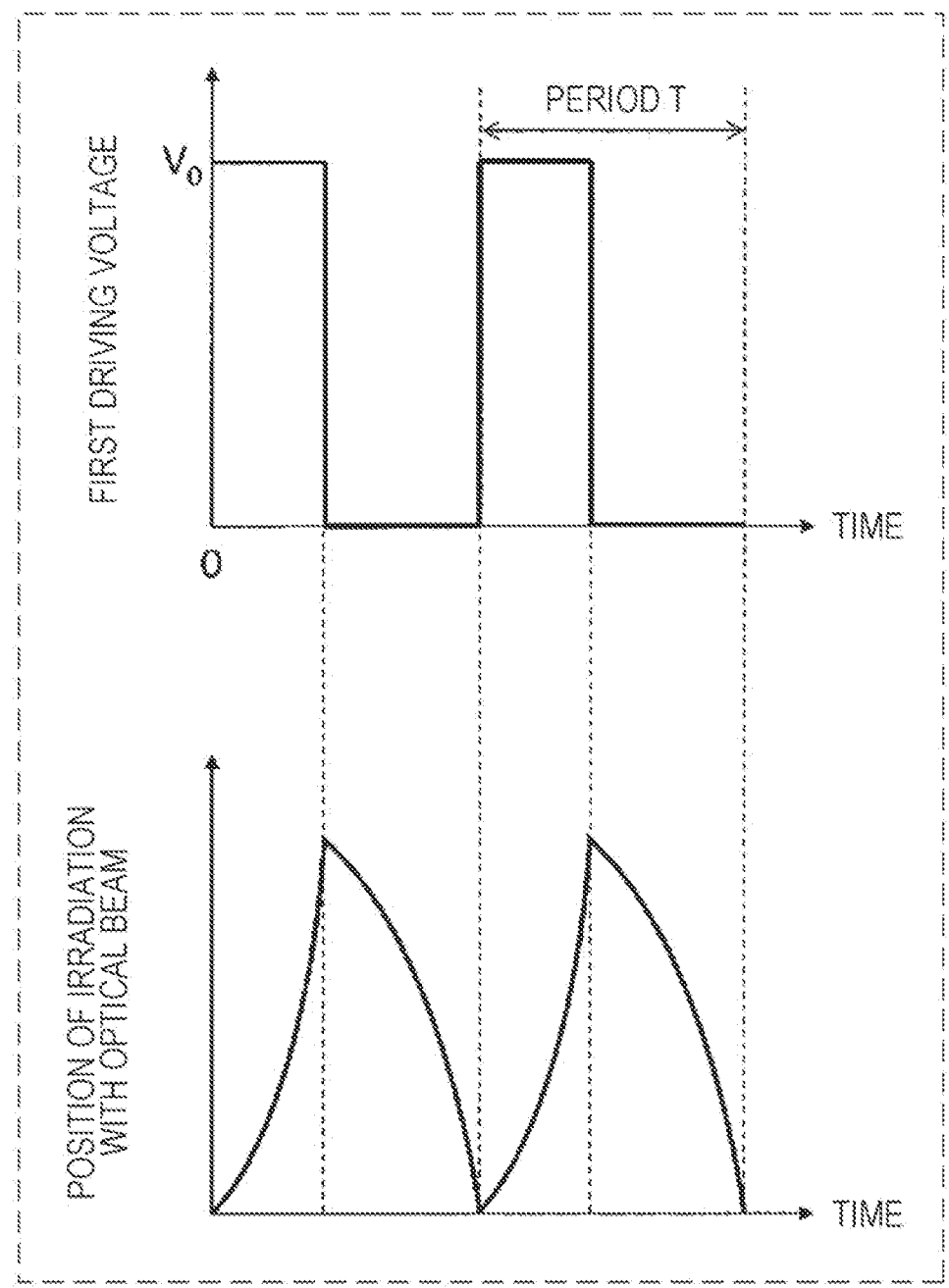
FIG. 3 is a diagram schematically showing an example of change in a first driving voltage over time and an example of change over time in the position of irradiation with an optical beam that changes along a first direction.

In the following, an example of the operation of changing the direction of the direction of the optical beam 100L along the first direction D$_1$ is described with reference to FIG. 3. The operation of changing the direction of the optical beam 100L along the second direction D$_2$ will be described later. FIG. 3 is a diagram schematically showing an example of change in the first driving voltage over time and an example of change over time in the position of irradiation with the optical beam 100L that changes along the first direction D$_1$. The upper drawing of FIG. 3 represents an example of change in the first driving voltage over time, and the lower drawing represents an example of change over time in the position of irradiation with the optical beam 100L. In the present embodiment, as shown in the upper drawing of FIG. 3, an action of turning the first driving voltage off (0 [V]) for a certain period of time after turning the first driving voltage on (V$_0$ [V]) for a certain period of time is repeated every period T. In this way, the first driving voltage repeatedly changes within a predetermined range of 0 [V] to V$_0$ [V]. In the present embodiment, the first driving voltage periodically changes but does not need to strictly periodically change. As shown in the lower drawing of FIG. 3, the position of irradiation with the optical beam 100L changes in a positive direction in a downward convex curve with passage of time while the first driving voltage is on. On the other hand, the position of irradiation with the optical beam 100L changes in a negative direction in an upward convex curve with passage of time while the first driving voltage is off.

Figure 4A:
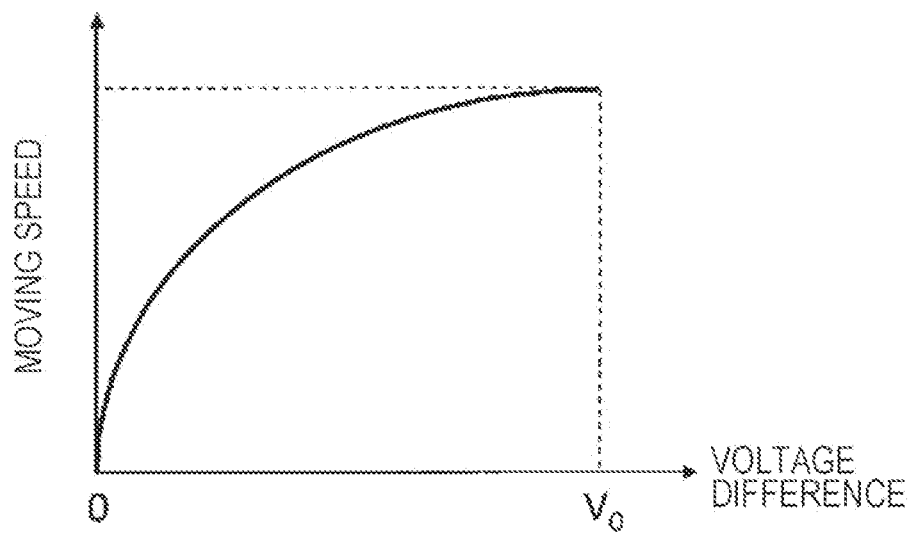
FIG. 4A is a diagram schematically showing an example of a relationship between a voltage difference and the moving speed of the position of irradiation with the optical beam.
Figure 4B:
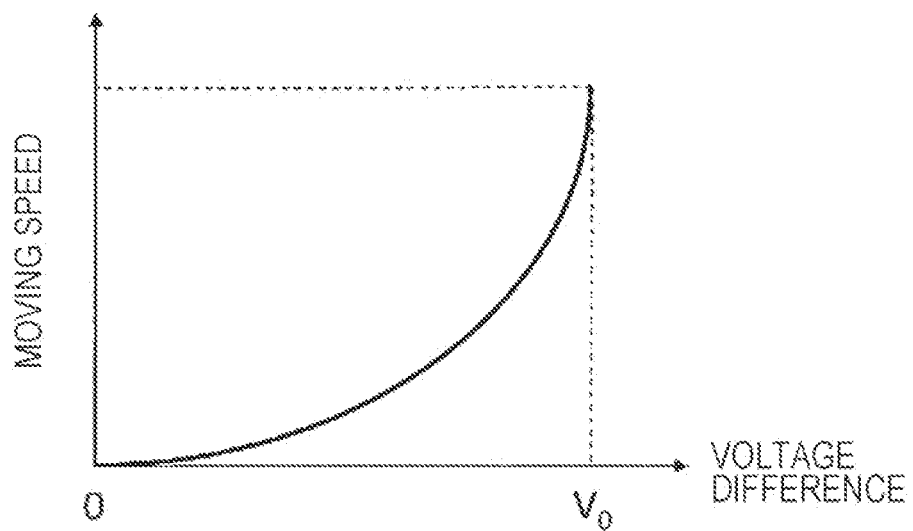
FIG. 4B is a diagram schematically showing another example of a relationship between a voltage difference and the moving speed of the position of irradiation with the optical beam.

Next, the moving speed of the position of irradiation with the optical beam 100L along the first direction D$_1$ is described with reference to FIGS. 4A and 4B. FIGS. 4A and 4B are each a diagram schematically showing an example of a relationship between a voltage difference made by changing the first driving voltage and the moving speed of the position of irradiation with the optical beam 100L. FIG. 4A shows an example of dependence of the moving speed on the voltage difference in a case where the first driving voltage has increased from 0 [V]. FIG. 4B shows an example of dependence of the moving speed on the voltage difference in a case where the first driving voltage has decreased from $V_0$ [V].

As shown in FIG. 4A, when the first driving voltage takes on an initial value of 0 [V], the moving speed of the optical beam 100L increases in an upward convex curve along with an increase in the voltage difference $\Delta V$ and becomes saturated at Voltage Difference $\Delta V=V_0$. When the first driving voltage has increased from 0 [V] to $V_0$ [V], the moving speed of the position of irradiation with the optical beam 100L is highest in a positive direction. As shown in FIG. 4B, when the first driving voltage takes on an initial value of $V=V_0$[V], the moving speed of the optical beam 100L increases in an downward convex curve along with an increase in the voltage difference $\Delta V$. When the first driving voltage has decreased from $V=V_0$ [V] to $V=0$ [V], the moving speed of the position of irradiation with the optical beam 100L is highest in a negative direction.

Figure 5:
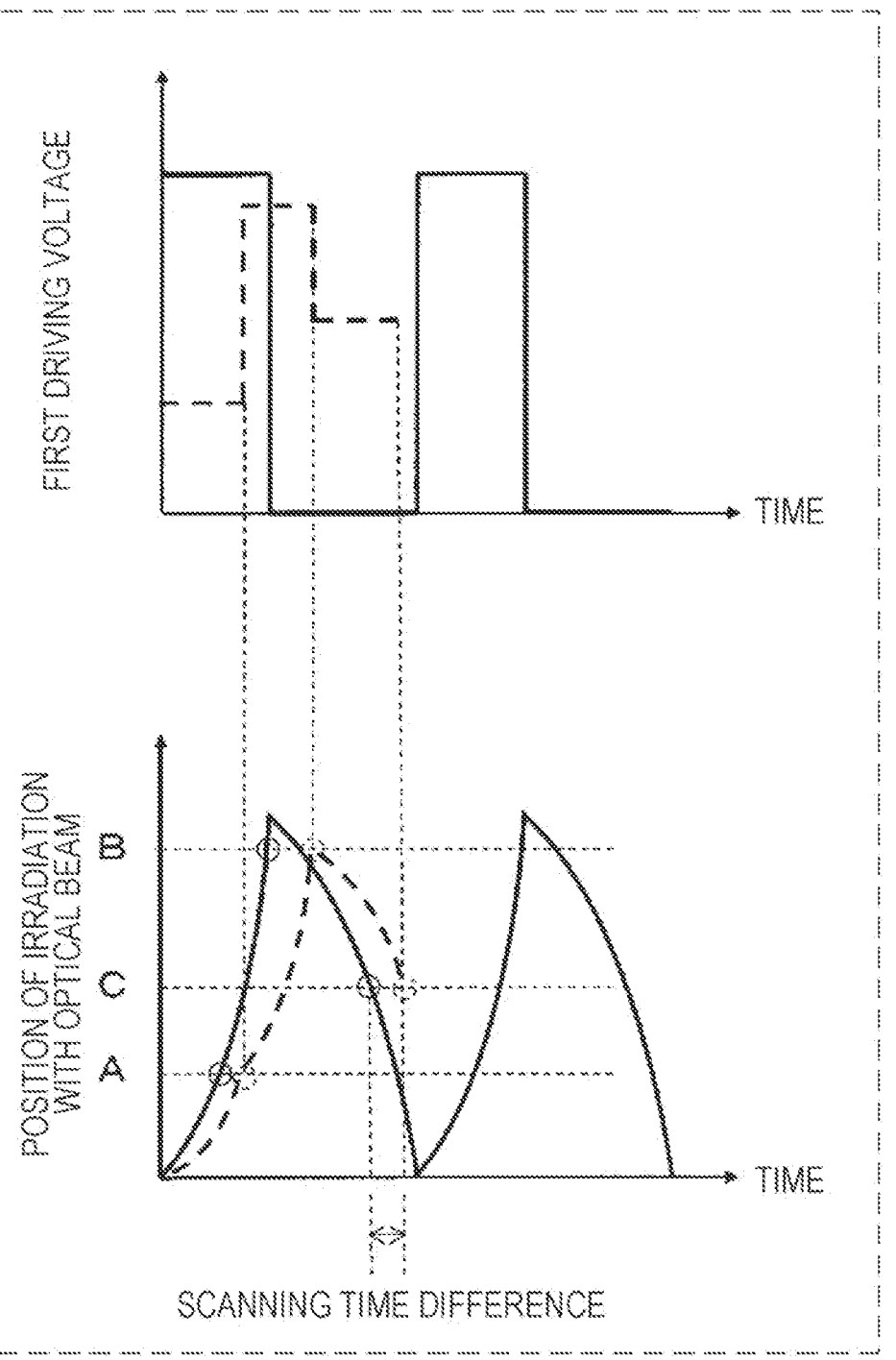
FIG. 5 is a diagram for explaining two actions of moving the position of irradiation with the optical beam to physical objects A, B, and C located along the first direction.

FIG. 5 is a diagram for explaining two actions of moving the position of irradiation with the optical beam 100L to physical objects A, B, and C located along the first direction $D_1$. Assume here for the sake of ease that each of the physical objects is located at one point. In actuality, each of the physical objects has a size. The "position of a physical object" herein does not necessarily indicate the position of one point but means the position of an area that the physical object occupies. The upper drawing of FIG. 5 represents an example of change in the first driving voltage over time, and the lower drawing represents an example of change over time in the position of irradiation with the optical beam 100L in the first direction $D_1$. The solid lines shown in FIG. 5 are identical to the solid lines shown in FIG. 3 and indicate an example of change in the first driving voltage over time in the present embodiment. The dashed lines shown in FIG. 5 indicate waveforms assumed by applying such first driving voltages that the optical beam 100L converges to the positions of the physical objects A, B, and C, respectively. As shown in the lower drawing of FIG. 5, it is found that the driving method according to the present embodiment as indicated by the solid lines allows the optical beam 100L to arrive at the physical objects A, B, and C in shorter amounts of time than the driving method indicated by the dashed lines. A reason for this is that as described with reference to FIGS. 4A and 4B, the moving speed of the optical beam 100L becomes higher as the voltage difference $\Delta V$ made by turning on and off the first driving voltage becomes greater. In a case where such a first driving voltage that the optical beam converges to the position of each physical object, the voltage difference $\Delta V$ is smaller than the maximum value $V_0$; therefore, the moving speed of the optical beam 100L is lower than in a case where the voltage difference $\Delta V$ is equal to the maximum value $V_0$. In this way, the present embodiment makes it possible to increase the moving speed of the optical beam along the first direction $D_1$ by periodically applying the first driving voltage with sufficiently high amplitude.

Figure 6:
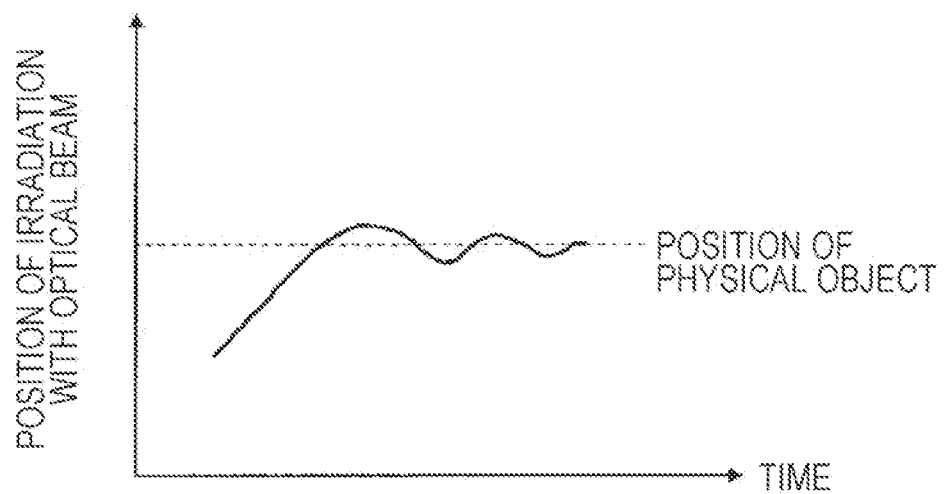
FIG. 6 is a diagram schematically showing an example of how the position of irradiation with the optical beam converges to the position of a physical object.

FIG. 6 is a diagram schematically showing an example of how the position of irradiation with the optical beam 100L converges to the position of a physical object. As shown in FIG. 6, in a case where such a first driving voltage is applied that the optical beam 100L converges to the position of the physical object, it takes a long time for the position of irradiation with the optical beam 100L to actually converge to the position. The time required to converge depends on a difference between the positions of irradiation with the optical beam 100L before and after movement. The greater the difference between the positions of irradiation is and the greater the voltage difference made by the change is, the longer the convergence time becomes. The smaller the voltage difference is, the shorter the convergence time becomes. In the present embodiment, the periodic repetition of the action of turning on and off the first driving voltage allows the position of irradiation with the optical beam 100L to pass through the position of the physical object at a comparatively high speed. The position of irradiation with the optical beam 100L can be found from a change in the first driving voltage over time during operation simply by grasping in advance a correspondence relationship, such as that shown in FIG. 3, between a change in the first driving voltage over time and a change over time in the position of irradiation with the optical beam 100L.

The optical beam 100L does not need to be always emitted. In the present embodiment, the control circuit 500 causes the light source 100 to emit the optical beam 100L$_0$ with such a timing that the position of irradiation with the optical beam 100L coincides with the position of a physical object in a case where the optical beam 100L has been emitted. In other words, the control circuit 500 causes the light source 100 to emit the optical beam 100L$_0$, as long as the first driving voltage falls within a particular range included in the predetermined range of 0 [V] to $V_0$ [V]. The phrase "such a timing that the position of irradiation coincides with the position of a physical object" here means such a timing that at least a part of the physical object is irradiated with an optical beam, assuming that the optical beam has been emitted.

Figure 7:
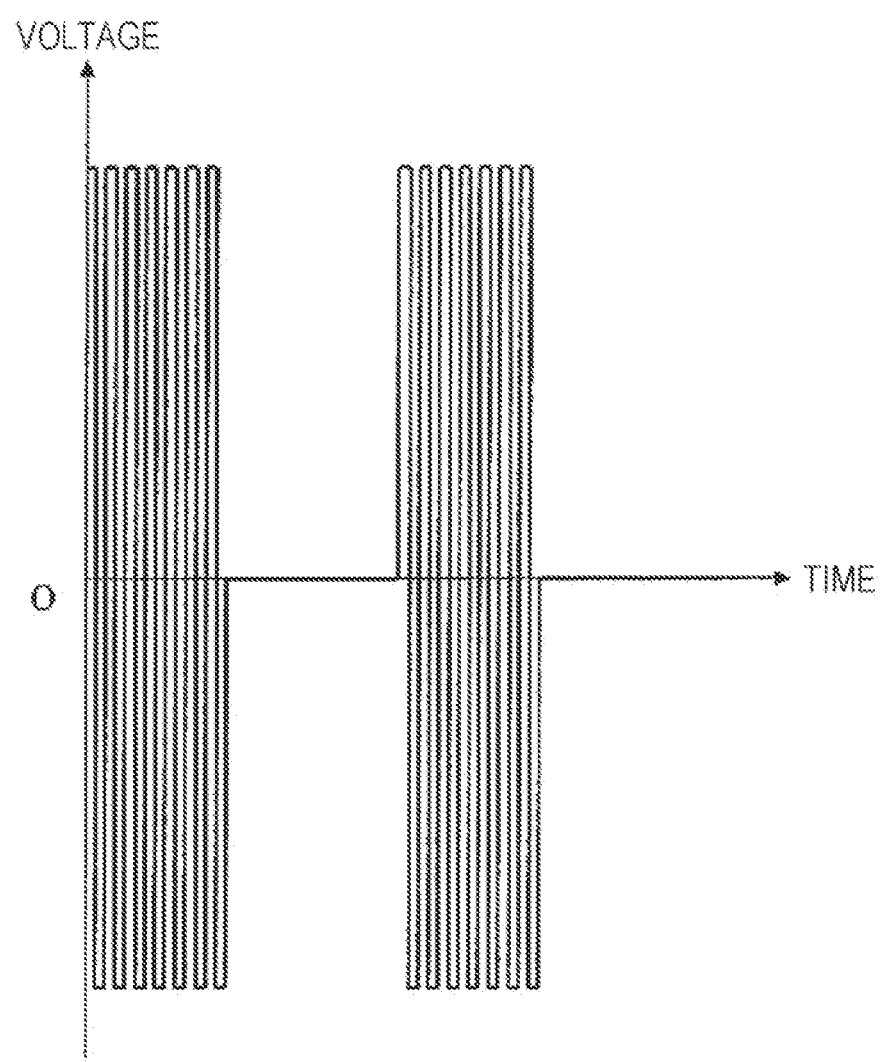
FIG. 7 is a diagram schematically showing another example of change in the first driving voltage over time.

Next, another example of an action of applying the first driving voltage is described with reference to FIG. 7. FIG. 7 is a diagram schematically showing another example of change in the first driving voltage over time. As shown in FIG. 7, a high frequency may be superimposed onto the first driving voltage shown in the upper drawing of FIG. 3. In the example shown in FIG. 7, a rectangular voltage having positive and negative amplitude within a certain period of time is applied seven times. Instead of the rectangular voltage, a sinusoidal voltage may be applied. Keep applying a positive voltage as shown in the upper drawing of FIG. 3 causes one of the pair of first electrodes 10*el* to be kept charged with positive ions and the other of the pair of first electrodes 10*el* to be kept charged with negative ions for a certain period of time. If such a state continues, the pair of first electrodes 10*el* deteriorate early, so that there is a possibility that a predetermined voltage can no longer be applied. As shown in FIG. 7, applying positive and negative voltages at high speeds makes it possible to reduce such deterioration of the pair of first electrodes 10*el*. Even if the first driving voltage is applied as shown in FIG. 7, the position of irradiation with the optical beam 100L changes as shown in the lower drawing of FIG. 3.

Figure 8:
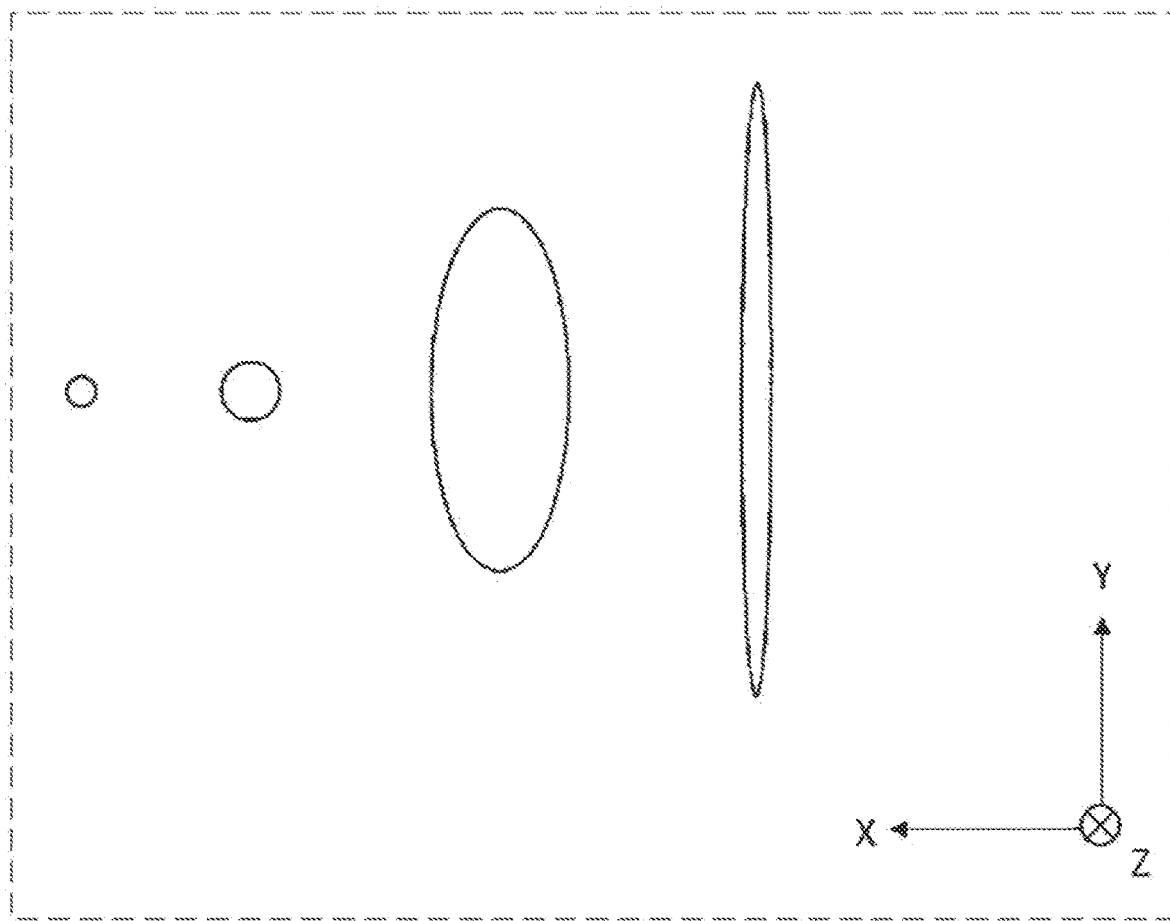
FIG. 8 is a diagram schematically showing examples of shapes of the optical beam.

Next, shapes of the optical beam 100L are described with reference to FIG. 8. FIG. 8 is a diagram schematically showing examples of shapes of the optical beam 100L. As shown in the leftmost drawing of FIG. 8, the optical beam 100L may take a circular shape whose spread angle is determined by a diffraction limit. The term "spread angle" here means an angle at which the optical beam 100L spreads toward both sides. As shown in the second drawing as counted from the left of FIG. 8, the optical beam 100L may take a circular shape whose spread angle is greater than or equal to the diffraction limit and less than or equal to 2 degrees. As shown in the third and fourth drawings as counted from the left of FIG. 8, the optical beam 100L may take an elliptical shape. In a line scan in which the aforementioned virtual screen is entirely irradiated by a unidirectional scan, the optical beam 100L may take an elliptical or linear shape whose spread angle along the major axis is greater than or equal to 30 degrees and less than or equal to 150 degrees and whose spread angle along the minor axis is greater than or equal to the diffraction limit and less than or equal to 2 degrees. Thus, the optical beam 100L may take any shape in the present embodiment, and the shape of the optical beam 100L may be determined depending on the intended use and the size of a physical object. A plurality of the optical beams 100L may be emitted at once.

Figure 9:
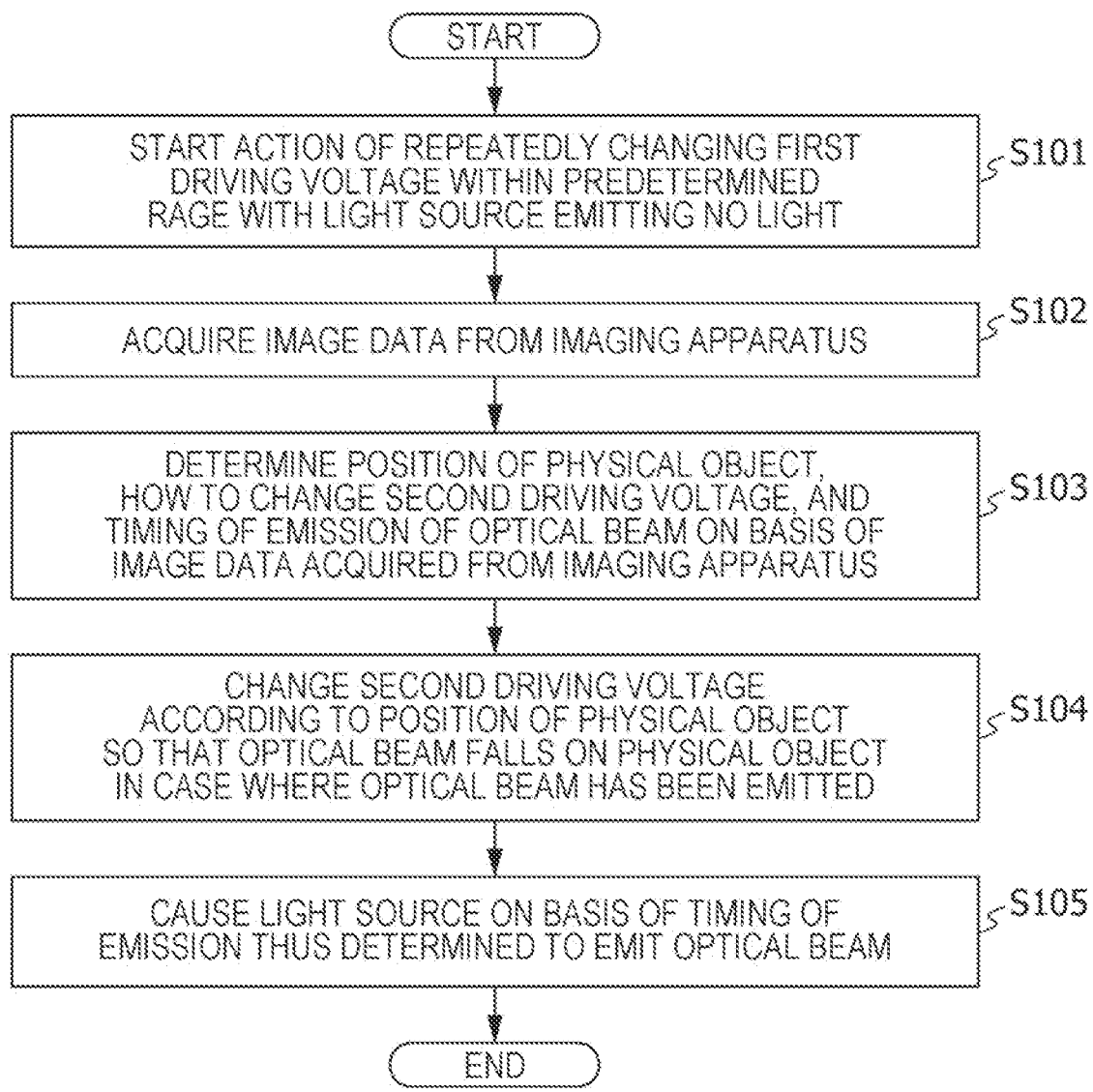
FIG. 9 is a flow chart showing an example of an operation of a control circuit.
Figure 10:
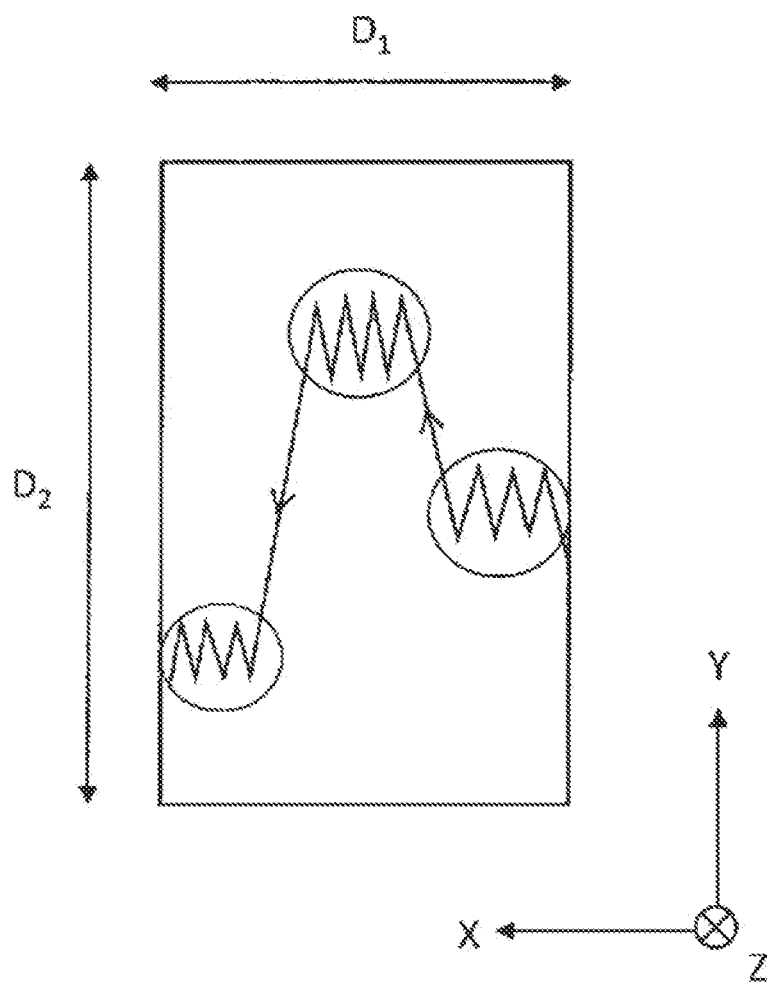
FIG. 10 is a diagram schematically showing an example of a relationship between the locus of the position of irradiation with the optical beam and the positions of physical objects in a case where the operation shown in FIG. 9 has been executed.

The following describes, with reference to FIGS. 9 and 10, an example of an operation of changing the direction of the optical beam 100L along the first direction $D_1$ and the second direction $D_2$ according to the present embodiment. FIG. 9 is a flow chart showing an example of an operation of the control circuit 500. As shown in FIG. 9, in step S101, the control circuit 500 starts an action of repeatedly changing the first driving voltage within the predetermined range with the light source 100 emitting no light. In the example shown in the upper drawing of FIG. 3, the predetermined range ranges from zero to the positive voltage. In step S102, the control circuit 500 acquires image data from the imaging apparatus 300. In step S103, the control circuit 500 determines the position of a physical object, how to change the second driving voltage, and the timing of emission of the optical beam $100L_0$ on the basis of the image data acquired from the imaging apparatus 300. In step S104, the control circuit 500 changes the second driving voltage according to the position or positions of one or more particular physical objects recognized from the image data so that the one or more physical objects can be irradiated with the optical beam 100L in a case where the optical beam 100L has been emitted. In step S105, on the basis of the timing of emission thus determined, the control circuit 500 causes the light source 100 to emit the optical beam $100L_0$. This timing of emission is such a timing that the one or more physical objects are irradiated with the optical beam 100L. Outside of this timing, the control circuit 500 causes the light source 100 to stop emitting the optical beam $100L_0$. In a period of during which the first driving voltage is being changed, the control circuit 500 executes the actions of steps S104 and S105 for each physical object. It should be noted that in a case where the direction of the optical beam 100L is changed solely along the first direction $D_1$ as shown in the lower drawing of FIG. 5, the action of, in step S103, determining how to change the second driving voltage and the action of step S104 are omitted.

FIG. 10 is a diagram schematically showing an example of a relationship between the locus of the position of irradiation with the optical beam 100L and the positions of physical objects in a case where the operation shown in FIG. 9 has been executed. The rectangular area shown in FIG. 10 indicates the aforementioned virtual screen. The arrow solid lines on the virtual screen represent the locus of the position of irradiation with the optical beam 100L, and the ellipses represent the positions of the physical objects. The positions of the three physical objects are determined in step S103. The optical beam $100L_0$ is emitted from the light source 100 only when the position of irradiation with the optical beam 100L coincides with the position of a physical object. The position of irradiation with the optical beam 100L whose direction has been changed by the optical deflector 200 may be controlled so as to finely reciprocate along the second direction $D_2$ so that each of the physical objects can be entirely scanned. Since the rate of change in the second direction $D_2$ is higher than the rate of change in the first direction $D_1$, such an operation can be achieved. In this operation, while increasing and decreasing a component of the direction of the optical beam 100L acting in the second direction $D_2$, the control circuit 500 causes the light source 100 to emit the optical beam $100L_0$ more than once. The control circuit 500 causes the photoreceptor device 400 to detect reflected light from the physical object. The control circuit 500 measures the distance to the physical object on the basis of a signal from the photoreceptor device 400.

In the present embodiment, the control circuit 500 changes the direction of the optical beam 100L along the second direction $D_2$, in which the rate of change is relatively high, according to the position or positions of one or more physical objects while repeatedly changing the direction of the optical beam 100L along the first direction $D_1$, in which the rate of change is relatively low. This operation of the control circuit 500 makes it possible to quickly measure the distance or distances to the one or more physical objects without scanning the whole scene. The size of the virtual screen according to the present embodiment along the second direction $D_2$ is larger than the size along the first direction $D_1$. When the size along the second direction $D_2$, in which the rate of change is relatively high, is larger, the distance or distances to the one or more physical objects can be more quickly measured.

Next, another example of an operation of changing the optical beam 100L along the first direction $D_1$ and the second direction $D_2$ according to the present embodiment is described with reference to FIGS. 11 to 13. FIG. 11 is a flow chart showing another example of an operation of the control circuit 500. Steps S201 and S202 are identical to steps S101 and S102 shown in FIG. 9, respectively. In step S203, the control circuit 500 determines the position or positions of one or more physical objects and an order of priority on the basis of the image data acquired from the imaging apparatus 300. The order of priority may be determined on the basis of the probability of a physical object being a person or the approximate distance to the physical object as measured by the imaging apparatus 300 serving as a ranging apparatus. In a case where there is a high probability that a physical object is a person or in a case where the approximate distance to the physical object is short, the physical object may be given high priority. In a case where there is a low probability that a physical object is a person or in a case where the approximate distance to the physical object is long, the physical object may be excluded from measurement. Further, high priority may be given, for example, to a physical object meeting the following conditions: (a) a case where the physical object is detected on the path of a vehicle including the photo-detection system 1000; and (b) a case where recognition of the physical object was impossible. The conditions (a) and (b) can be determined by publicly-known means on the basis of a result of image recognition involving the use of an immediately preceding one frame in the image data acquired from the imaging apparatus 300 and travel plan information on the vehicle. Besides this, high priority may be given, for example, to a physical object meeting the following conditions: (c) a case where the physical object is traveling toward the vehicle; (d) a case where a predicted path of the physical object intersects the path of the vehicle, and (e) a change in motion vector of the physical object is greater than a predetermined reference. The conditions (c) to (e) can be determined on the basis of the motion vector of the physical object as calculated by publicly-known means using a plurality of frames in the image data acquired from the imaging apparatus 300. Predetermined weights are assigned to a given combination selected from among the plurality of conditions listed above, and the final order of priority of the one or more physical objects is determined. In step S204, the control circuit 500 determines the order of measurement of the physical objects, how to change the second driving voltage, and the timing of emission of the optical beam 100L on the basis of the order of priority determined in step S203. Steps S205 and S206 are identical to steps S104 and S105 shown in FIG. 9, respectively. The control circuit 500 executes the actions of steps S205 and S206 for each physical object. In a case where the image data is updated at any time, the control circuit 500 may repeatedly execute the actions of steps S202 to S206.

Figure 12A:
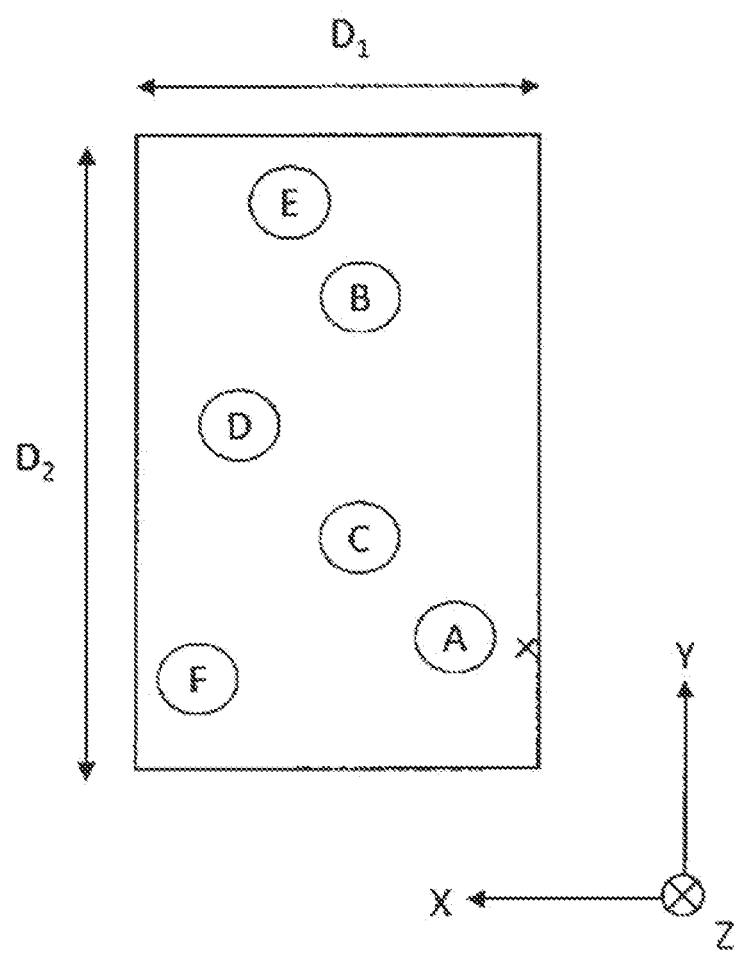
FIG. 12A is a diagram schematically showing an example of an arrangement of physical objects A to F recognized from image data acquired in step S202.

FIG. 12A is a diagram schematically showing an example of an arrangement of physical objects A to F recognized from image data acquired in step S202. The mark "x" in FIG. 12A represents the current position of irradiation with the optical beam 100L. FIGS. 12B and 12C are diagrams showing examples of information determined in steps S203 and S204, respectively.

As shown in FIG. 12B, the control circuit 500 determines, for example, that the physical objects D and F are not persons, and excludes these physical objects from measurement. The control circuit 500 assigns priority for the other physical objects and assigns coordinates to the positions of the physical objects. In the example shown in FIG. 12B, the physical object E is given the highest priority, the physical object C the second highest priority, the physical object A the third highest priority, and the physical object B the lowest priority. The coordinates of the position of the physical object A is $(X_a, Y_a)$. $X_a$ is a first component obtained by an orthogonal projection of the distance from the origin point (not illustrated) to the position of the physical object A onto a line parallel to the first direction $D_1$, and $Y_a$ is a second component obtained by an orthogonal projection of the distance from the origin point (not illustrated) to the position of the physical object A onto a line parallel to the second direction $D_2$. The same applies to the coordinates of the other physical objects. The coordinates of the excluded physical objects do not necessarily need to be determined.

As shown in FIG. 12C, the control circuit 500 determines the order of measurement of the physical objects. The order of measurement is determined in ascending order of difference between the first component at the coordinates of the current position of irradiation with the optical beam 100L and the first component at the coordinates of the position of a physical object. Note, however, that when the first components at the coordinates of the positions of a plurality of physical objects coincide as in the case of the physical objects B and C, the physical object given the higher priority is measured first. The physical object given the lower priority is measured the next time the optical beam 100L passes. In the example shown in FIG. 12C, the physical object A is measured first, the physical object C second, the physical object E third, and the physical object B fourth. $V_a$ is a second driving voltage for changing the position of irradiation with the optical beam 100L to the position of the physical object A, and $T_a$ is a timing of emission for irradiating the physical object A. The timing of emission is for example a time after the start of the first measurement. The same applies to second driving voltages and timings of emission for the other physical objects.

Figure 13:
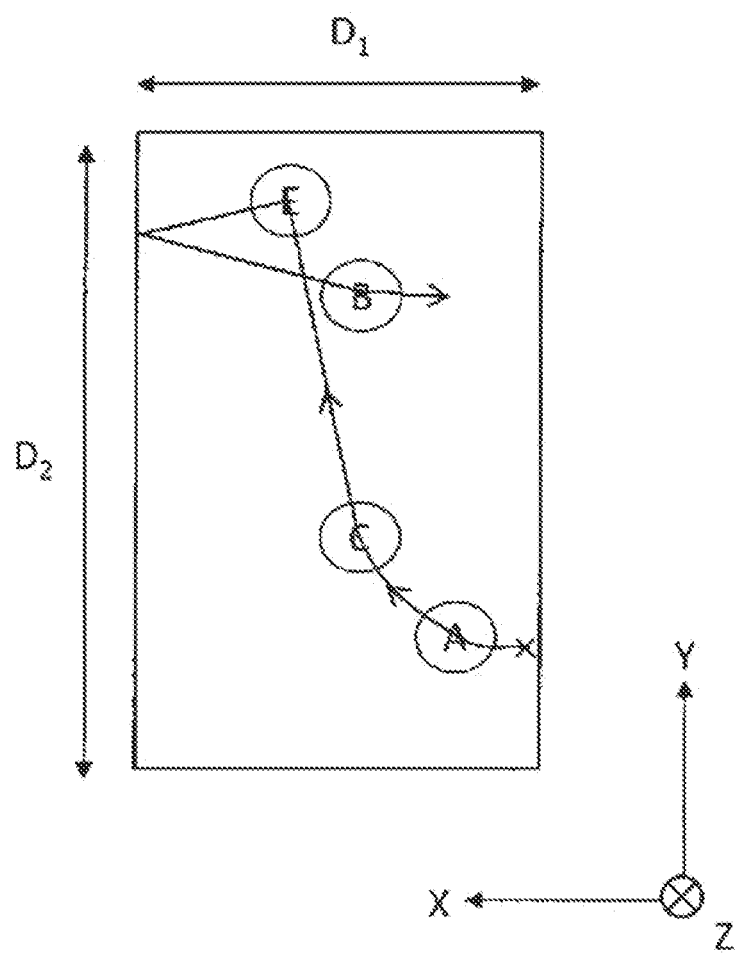
FIG. 13 is a diagram schematically showing an example of a relationship between the locus of the position of irradiation with the optical beam and the positions of physical objects in a case where the operation shown in FIG. 11 has been executed.

FIG. 13 is a diagram schematically showing an example of a relationship between the locus of the position of irradiation with the optical beam 100L and the positions of physical objects in a case where the operation shown in FIG. 11 has been executed. The arrow solid lines on the virtual screen represent the locus of the position of irradiation with the optical beam 100L. As shown in FIG. 13, the position of irradiation with the optical beam 100L passes through the physical objects A, C, and E and then turns to pass through the physical object B. The position of irradiation with the optical beam 100L in the first direction $D_1$ periodically changes. The optical beam $100L_0$ is emitted from the light source 100 only when the position of irradiation with the optical beam 100L coincides with the position of a physical object. In this way, the control circuit 500 irradiates a plurality of physical objects in sequence by, while changing the component of the direction of the optical beam 100L acting in the second direction $D_2$, causing the light source 100 to emit the optical beam $100L_0$ more than once.

The order of measurement of the physical objects may be updated at any time before the end of the measurement of the distances to all physical objects. In actuality, most physical objects are larger than the shape of the optical beam 100L. The second driving voltages and the timings of emission shown in FIG. 12C may have a certain degree of flexibility so that the physical objects can be entirely irradiated. Alternatively, as shown in FIG. 10, the position of irradiation with the optical beam 100L may finely reciprocate along the second direction $D_2$ so that each of the physical objects can be entirely scanned.

Modification of Optical Deflector 200

Figure 14A:
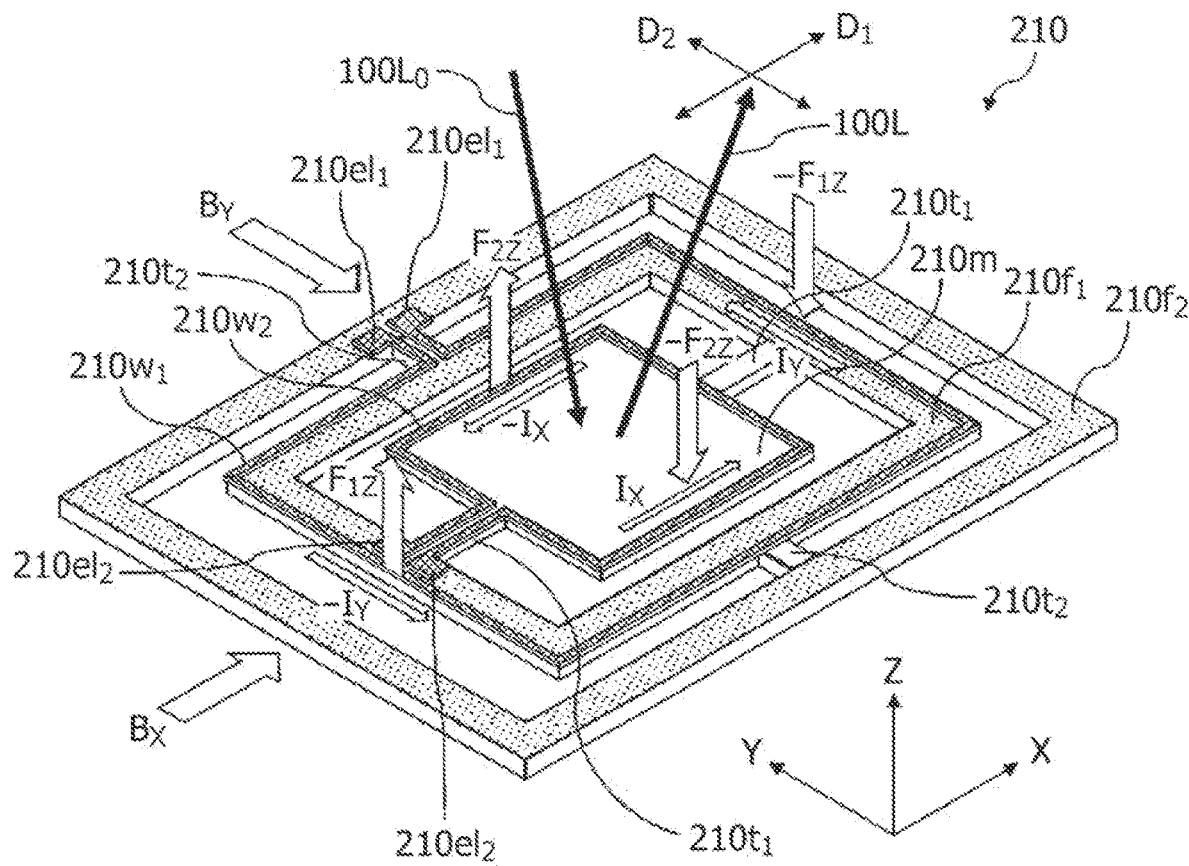
FIG. 14A is a perspective view schematically showing an example of an optical deflector according to a modification of the present embodiment.

Next, a modification of the optical deflector 200 according the present embodiment is described with reference to FIGS. 14A and 14B. FIG. 14A is a perspective view schematically showing an example of an optical deflector 210 according to a modification of the present embodiment. The optical deflector 210 according to the modification of the present embodiment includes an electromagnetic MEMS mirror. The optical deflector 210 according to the modification of the present embodiment includes a mirror 210m, an inner frame $210f_1$ supporting the mirror 210m with a first torsion bar $210t_1$, and an outer frame $210f_2$ supporting the inner frame $210f_1$ with a second torsion bar $210t_2$. A torsion bar is a type of spring that exerts repelling force when distorted. The mirror 210m rotates on the first torsion bar $210t_1$, which is parallel to the X direction, within the inner frame $210f_1$. The inner frame $210f_1$ rotates on the second torsion bar $210t_2$, which is parallel to the Y direction, within the outer frame $210f_2$. A first wire $210w_1$ is attached along an outer edge of the inner frame $210f_1$, and a second wire $210w_2$ is attached along an outer edge of the mirror 210m. The first wire $210w_1$ has the pair of first electrodes $210el_1$ at both ends thereof, and the second wire $210w_2$ has a pair of second electrodes $210el_2$ at both ends thereof. A magnetic field is applied in a direction parallel to the X-Y plane. The optical beam $100L_0$ emitted from the light source 100 is reflected by the mirror 210m and emitted outward as the optical beam 100L.

When the first driving voltage is applied to the pair of first electrodes $210el_1$, an electric current flows through the first wire $210w_1$. An electric current $I_Y$ or $-I_Y$ flowing through a portion of the first wire $210w_1$ extending in the Y direction and a component $B_X$ of the magnetic field acting parallel to the X direction cause a Lorentz force $-F_{1Z}$ or $F_{1Z}$ acting parallel to a Z direction to act on the portion extending in the Y direction. As a result, the inner frame $210f_1$ rotates on the Y axis, so that the direction of the optical beam 100L changes along the first direction $D_1$. Similarly, when the second driving voltage is applied to the pair of second electrodes $210el_2$, an electric current flows through the second wire $210w_2$. An electric current $I_X$ or $-I_X$ flowing through a portion of the second wire $210w_2$ extending in the X direction and a component $B_Y$ of the magnetic field acting parallel to the Y direction cause a Lorentz force $-F_{2Z}$ or $F_{2Z}$ acting parallel to the Z direction to act on the portion extending in the X direction. As a result, the mirror 210m rotates on the X axis, so that the direction of the optical beam 100L changes along the second direction $D_2$. As noted above, the change in direction of the MEMS mirror according to changes in the first driving voltage and the second driving voltage causes the direction of the optical beam 100L that is reflected by the mirror 210m to change along the first direction $D_1$ and the second direction $D_2$.

The speed of rotation at which the inner frame $210f_1$, which supports the mirror 210m, rotates on the Y axis is lower than the speed of rotation at which the mirror 210m rotates on the X axis. This is because a total weight of the mirror 210m and the inner frame $210f_1$ is heavier than the weight of the mirror 210m. Accordingly, in the optical deflector 210 according to the modification too, the rate of change in the first direction $D_1$ is lower than the rate of change in the second direction $D_2$. The rate of change in the first direction $D_1$ may for example be higher than or equal to 10 Hz and lower than or equal to 500 Hz, and the rate of change in the second direction $D_2$ may for example be higher than or equal to 50 Hz and lower than or equal to 1 kHz. Even in this case, the operations of the control circuit 500 shown in FIGS. 9 and 11 make it possible to quickly measure the distance to a physical object.

Figure 14B:
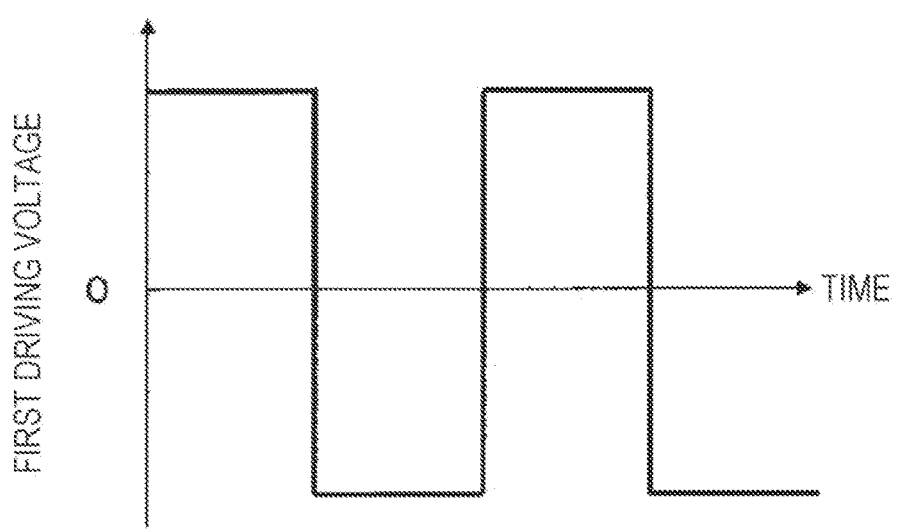
FIG. 14B is a diagram schematically showing an example of change over time in a first driving voltage that is applied to a pair of first electrodes of the optical deflector of FIG. 14A.

FIG. 14B is a diagram schematically showing an example of change over time in the first driving voltage that is applied to the pair of first electrodes $210el_1$ of the optical deflector 210 of FIG. 14A. In the example shown in FIG. 14B, an action of applying a negative voltage for a certain period of time after having applied a positive voltage for a certain period of time is periodically repeated. In other words, the first driving voltage periodically changes within the predetermined range from the negative voltage to the positive voltage. The negative voltage and the positive voltage may be equal or different in absolute value to or from each other. The purpose for which the negative voltage is applied unlike in the example shown in the upper drawing of FIG. 3 is to greatly change the direction of the optical beam 100L along the first direction $D_1$ by inverting the orientation of the Lorentz force by changing the orientation of the electric current flowing through the portion of the first wire $210w_1$ extending in the Y direction.

The optical deflector 210 may include an electrostatic MEMS mirror instead of the electromagnetic MEMS mirror. The electrostatic MEMS mirror is configured such that the MEMS mirror rotates under the influence of the attractive forces between electrodes. In the electrostatic MEMS mirror too, the rate of change in one of two intersecting directions is lower than the rate of change in the other of the two intersecting directions for a reason similar to that given in the case of the electromagnetic MEMS mirror. The lower rate of change may for example be higher than or equal to 10 Hz and lower than or equal to 500 Hz, and the higher rate of change may for example be higher than or equal to 50 Hz and lower than or equal to 1 kHz.

Example of Application

Figure 15:
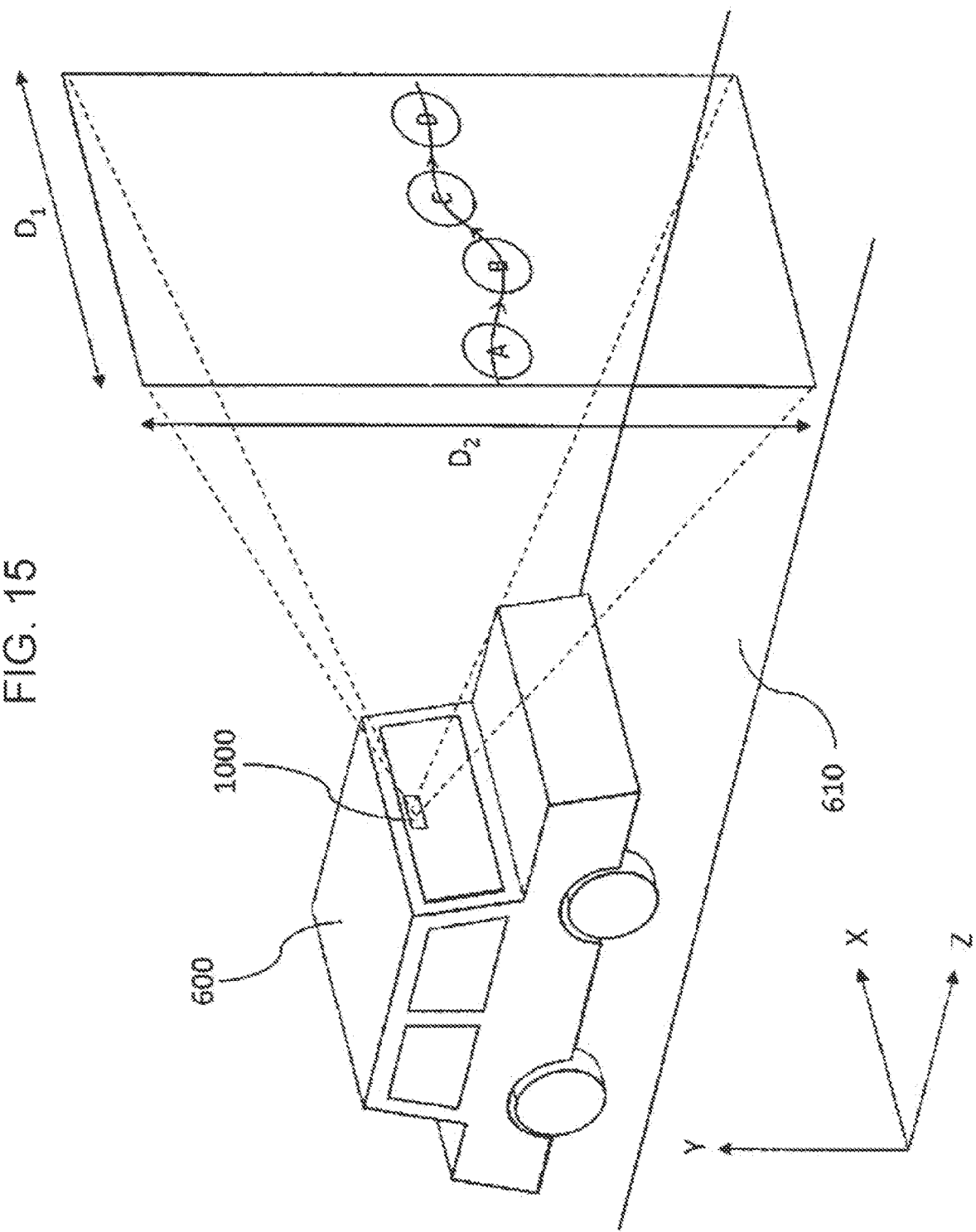
FIG. 15 is a diagram schematically showing a vehicle including the photo-detection system.

Next, an example of application of the photo-detection system 1000 according to the present embodiment is described with reference to FIG. 15. FIG. 15 is a diagram schematically showing a vehicle 600 including the photo-detection system 1000. The arrow solid lines on the virtual screen represent the locus of the position of irradiation with the optical beam 100L. As shown in FIG. 15, the photo-detection system 1000 is attached to the vehicle 600 for use.

The photo-detection system 1000 measures the distance to a physical object, the physical object being a person who is in front of the vehicle 600 on a road 610. In a case where four pedestrians cut across in front of the vehicle 600 on the road 610, projecting the pedestrians as physical objects onto the virtual screen causes four physical objects represented by physical objects A to D to be placed substantially parallel to one another on a horizontal plane of the road 610. In the example shown in FIG. 15, the first direction D1, in which the rate of change is relatively low, is substantially parallel to the horizontal plane of the road 610. Simply executing the operation of the control circuit 500 according to the present embodiment makes it possible to quickly measure the distances to all physical objects simply by slightly changing the direction of the optical beam 100L along the second direction $D_2$ while changing the direction of the optical beam 100L along the first direction $D_1$ only once as indicated by the locus. The first direction $D_1$ does not necessarily need to be substantially parallel to the horizontal plane of the road 610. Even if the angle formed by the first direction $D_1$ and the horizontal plane of the road 610 is for example greater than or equal to 0 degree and less than or equal to 45 degrees, the distances to the physical objects can be relatively quickly measured.

A light emitting device, a photo-detection system, and a vehicle according to embodiments of the present disclosure can be utilized, for example, for the purpose of measuring the distance to a physical object.

What is claimed is:

1. A light emitting device comprising:
   a light source that emits an optical beam toward a scene in response to a control signal inputted to the light source;
   an optical deflector that changes a direction of the optical beam in response to a driving voltage inputted to the optical deflector; and
   a control circuit that controls a timing of emission of the optical beam and the direction of the optical beam by inputting the control signal to the light source and inputting the driving voltage to the optical deflector, wherein:
   the optical deflector is configured to change the direction of the optical beam along a first direction and a second direction different from the first direction,
   a rate of change in the direction of the optical beam along the first direction is lower than a rate of change in the direction of the optical beam along the second direction,
   the control circuit acquires a position or positions of one or more physical objects included in the scene, and
   in a period of time during which a component of the direction of the optical beam acting in the first direction is being periodically changed by the driving voltage, the control circuit changes, when the control circuit determines that the optical beam is to be located on the position or the positions of the one or more physical objects acquired by the control circuit, a component of the direction of the optical beam acting in the second direction.

2. The light emitting device according to claim 1, wherein the control circuit periodically changes the driving voltage.

3. The light emitting device according to claim 1, wherein the optical deflector includes
   first and second multilayer reflecting films facing each other,
   a liquid crystal layer located between the first and second multilayer reflecting films, and two electrodes through which the driving voltage is applied to the liquid crystal layer, the optical beam emitted from the light source propagates through inside of the liquid crystal layer and is emitted from the first multilayer reflecting film, and the direction of the optical beam that is emitted from the first multilayer reflecting film changes according to a change in the driving voltage.

4. The light emitting device according to claim 1, wherein the optical deflector includes a MEMS mirror that reflects the optical beam emitted from the light source, the MEMS mirror rotates through application of the driving voltage, and the direction of the optical beam thus reflected changes as a direction of the MEMS mirror changes according to a change in the driving voltage.

5. The light emitting device according to claim 1, wherein the driving voltage falls within a predetermined range ranging from a negative first voltage to a positive second voltage.

6. The light emitting device according to claim 1, wherein the first direction and the second direction are orthogonal to each other.

7. The light emitting device according to claim 1, wherein the light emitting device is attached to a vehicle for use, and in a state of being attached to the vehicle, an angle formed by a plane including the first direction and a horizontal plane is greater than or equal to 0 degree and less than or equal to 45 degrees.

8. A photo-detection system comprising:

the light emitting device according to claim 1; and a photoreceptor device that detects reflected light from one or more physical objects.

9. The photo-detection system according to claim 8, wherein the photoreceptor device includes an imaging apparatus that generates image data representing the scene including the position or positions of the one or more physical objects.

10. A vehicle comprising the photo-detection system according to claim 8.

11. The light emitting device according to claim 1, wherein the one or more physical objects include a plurality of physical objects, the control circuit acquires, from an imaging apparatus, image data representing the scene including the plurality of physical objects, the control circuits determines an order of priority of the plurality of physical objects recognized from the image data, and in a period of time during which the driving voltage is being changed, the control circuit changes, according to positions of the plurality of physical objects obtained from the image data and the order of priority, a component of the direction of the optical beam acting in the second direction.

12. A method for controlling a light emitting device, the light emitting device including a light source that emits an optical beam toward a scene in response to a control signal inputted to the light source, and an optical deflector that changes a direction of the optical beam in response to a driving voltage inputted to the optical deflector, the optical deflector configured to change the direction of the optical beam along a first direction and a second direction different from the first direction, a rate of change in the direction of the optical beam along the first direction being lower than a rate of change in the direction of the optical beam along the second direction, the method comprising:

acquiring a position or positions of one or more physical objects included in the scene; and in a period of time during which a component of the direction of the optical beam acting in the first direction is being periodically changed by the driving voltage, changing, when it is determined that the optical beam is to be located on the position or the positions of the one or more physical objects, a component of the direction of the optical beam acting in the second direction.

13. A non-transitory computer-readable medium having a program executed by a computer, the computer being configured to control a light emitting device, wherein the light emitting device comprises a light source that emits an optical beam toward a scene in response to a control signal inputted to the light source and an optical deflector that changes a direction of the optical beam in response to a driving voltage inputted to the optical deflector, the optical deflector configured to change the direction of the optical beam along a first direction and a second direction different from the first direction, a rate of change in the direction of the optical beam along the first direction being lower than a rate of change in the direction of the optical beam along the second direction, the program causing the computer to execute operations including:

acquiring a position or positions of one or more physical objects included in the scene; and in a period of time during which a component of the direction of the optical beam acting in the first direction is being periodically changed by the driving voltage, changing, when it is determined that the optical beam is to be located on the position or the positions of the one or more physical objects, a component of the direction of the optical beam acting in the second direction.

* * * * *